United States Patent [19]

Lee

[11] Patent Number: 4,892,370

[45] Date of Patent: Jan. 9, 1990

[54] MEANS AND METHOD FOR IMPLEMENTING A TWO-DIMENSIONAL TRUTH-TABLE LOOK-UP HOLGRAPHIC PROCESSOR

[76] Inventor: Yun-Parn T. Lee, 3991A Miramar St., La Jolla, Calif. 92037

[21] Appl. No.: 157,276

[22] Filed: Feb. 17, 1988

Related U.S. Application Data

[63] Continuation-in-part of Ser. No. 23,676, Mar. 9, 1987, abandoned.

[51] Int. Cl.$^4$ .......................... G02B 5/32; G06G 9/00; G06G 7/16
[52] U.S. Cl. .............................. 350/3.74; 350/162.12; 350/162.13; 364/727
[58] Field of Search .................. 350/3.66, 3.74, 162.12, 350/162.13, 162.14, 162.15, 355; 364/713, 724, 726, 727, 728.01, 728.03, 728.05

[56] References Cited

U.S. PATENT DOCUMENTS

| | | | |
|---|---|---|---|
| 4,073,010 | 2/1978 | Casasent et al. | 350/162.13 |
| 4,318,581 | 3/1982 | Guest et al. | 350/3.74 |
| 4,460,969 | 7/1984 | Chen et al. | 364/727 |
| 4,590,608 | 5/1986 | Chen et al. | 364/727 |
| 4,607,344 | 8/1986 | Athale et al. | 350/162.12 |
| 4,686,646 | 8/1987 | Goutzouus | 350/355 |

OTHER PUBLICATIONS

Guest et al., "Two Proposed Holographic Numerical Optical Processors," *SPIE vol. 185: Optical Processing Systems* (1979), pp. 42–50.
Lechner, "A Transform Approach to Logic Design," *IEEE Transaction on Computers*, vol. C-19, No. 7, Jul. 1970.
Lloyd et al., "Spectral Summation Techniques for the Synthesis of Digital Logic Networks," *Proceedings of the IEEE International Conference: Manufacture Electronics* (1979), pp. 66–70.
Fossum, "Charge-Coupled Computing for Focal Plane Image Preprocessing," *Optical Engineering*, Sep. 1987, pp. 916–922.
Edwards, "The Application of the Rademacher-Walsh Transform to Boolean Function . . . ," *IEEE Transactions on Computers*, vol. C-24, No. 1, Jan. 1975, pp. 48–60.
Kodandpani et al., "A Note on Minimal Reed-Muller Canonical Forms of Switching Functions." *IEEE Transactions on Computers*, Mar. 1977, pp. 310–313.
Jablonowski et al., "Matrix Multiplication by Optical Mewthods," *Applied Optics*, vol. 11, No. 1, Jan. 1972, pp. 174–178.
Cao et al., "Coherent Optical Techniques for Diagonalization and Inversion of Circulent Matrices" *Applied Optics*, vol. 23, No. 6, Mar. 15, 1984, pp. 803–805.

*Primary Examiner*—Bruce Y. Arnold
*Assistant Examiner*—Martin Lerner
*Attorney, Agent, or Firm*—Charmasson & Holz

[57] ABSTRACT

Algorithms and optical processor architectures for implementing a two-dimensional truth-table look-up processor are disclosed. An optical holographic medium stores the spectral expansion coefficients that map two-dimensional digital inputs of a binary truth-table into two-dimensional outputs of that binary truth table. Several algorithms are described using discrete orthogonal transforms such as one of the Walsh transforms (the Walsh-Hadamard transform, the Rademacher-Walsh transform, the Walsh-Kaczmarz transform) or the Haar transform. These transforms are used to find the corresponding spectral vectors and the corresponding boolean basis vector. The inner product multiplication of the spectral vector with the boolean basis vector yields the digital outputs of the binary truth-table. Another algorithm uses the Reed-Muller expansion which is a non-orthogonal transform. Various architectures of digital optic two-dimensional truth-table look-up processors are also disclosed. They include a coded phase correlator, a matrix multiplication optical processor, a bipolar coded phase optical correlator and a bipolar matrix multiplication optical processor.

39 Claims, 19 Drawing Sheets $$RW = \begin{Bmatrix} +1 & +1 & +1 & +1 & +1 & +1 & +1 & +1 \\ +1 & +1 & +1 & +1 & -1 & -1 & -1 & -1 \\ +1 & +1 & -1 & -1 & +1 & +1 & -1 & -1 \\ +1 & -1 & +1 & -1 & +1 & -1 & +1 & -1 \\ +1 & +1 & -1 & -1 & -1 & -1 & +1 & +1 \\ +1 & -1 & +1 & -1 & -1 & +1 & -1 & +1 \\ +1 & -1 & -1 & +1 & +1 & -1 & -1 & +1 \\ +1 & -1 & -1 & +1 & -1 & +1 & +1 & -1 \end{Bmatrix}$$

FIG 2b

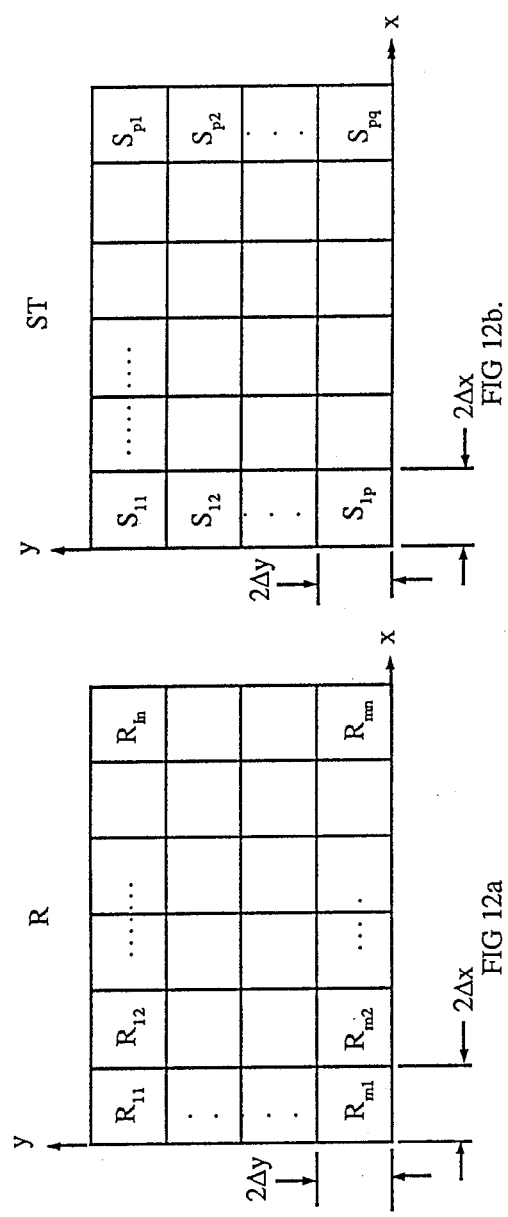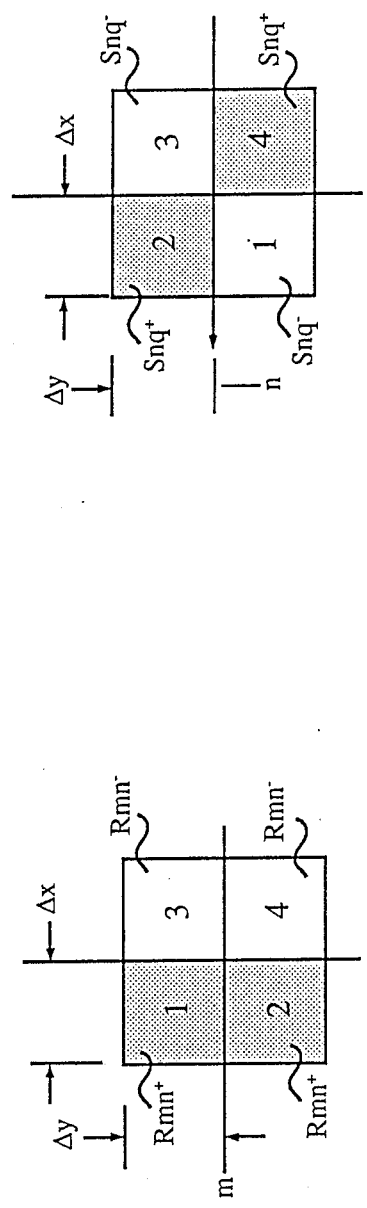
FIG 12a
FIG 12b.
FIG 12c
FIG 12d

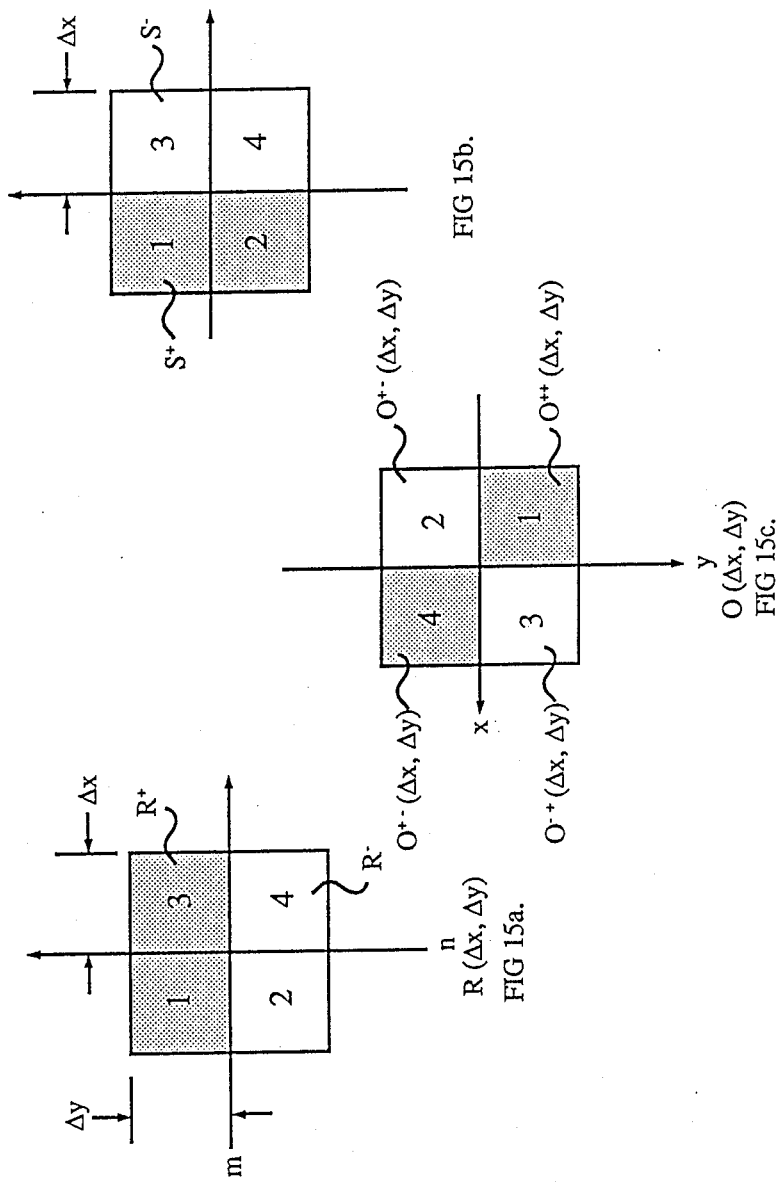

MEANS AND METHOD FOR IMPLEMENTING A TWO-DIMENSIONAL TRUTH-TABLE LOOK-UP HOLGRAPHIC PROCESSOR

REFERENCE TO RELATED APPLICATION

This application is a continuation-in-part of Ser. No. 023,676 filed Mar. 9, 1987 now abandoned.

FIELD OF THE INVENTION

The invention relates to holographic optical processors for two-dimensional truth-table look-up processing and to the algorithms and computational procedures used therein. More specifically, the invention relates to the mapping of digital input data vectors into digital output data by means of spectral expansion vectors and to the algorithms and computational transformations needed to calculate the coefficients of those spectral expansion vectors. The present invention also relates to architectures of optical holographic processors used for implementing those algorithms.

BACKGROUND OF THE INVENTION

For many years, there has been considerable research in optical digital computing systems with the objective of developing and implementing parallel processing systems. The advantages of using optical systems allowing high throughput parallel processing with very high space-bandwidth products are well known to the persons skilled in the art. Nevertheless, most optical systems heretofore used have been analog in nature and have therefore sacrificed some of the accuracy and flexibility that digital computing can provide. Furthermore, analog optical systems have severe limitations in the sizes of the operational gates. Continuing efforts in which the object of the present invention partakes have been made to combine optical systems and digital algorithms in order to obtain the benefits of both.

In the article entitled "Coherent optical implementation of generalized two-dimensional transforms", by James R. Leger and Sing. H. Lee, *Optical Engineering*, Vol. 18, no. 5, 1979, there is disclosed a coded phase coherent optical processor capable of performing two dimensional linear transformations. The set of two-dimensional Walsh functions is chosen as a transform basis. The coherent optical correlator performs a correlation function between a two-dimensional object image and the Walsh-Hadamard transform of that image. The optical output plane consists of delta functions which represent the maximum of eight discrete levels of the Walsh-Hadamard transformation. However, without the accurate computation of spectral expansion functions and accurate data encoding of computer generated holograms, the coded phase optical correlator can only play a limited role for optical image processing and optical pattern recognition. This article is hereby incorporated by reference.

In U.S. Pat. No. 4,318,581 to Guest, published in March 1982 and in the article entitled "Two proposed holographic numerical optical processors", by C. C. Guest and T. K. Gaylord, SPIE, Vol. 185, 1979, there are disclosed two holographic numerical optical processors based on EXCLUSIVE OR processing and NAND-OR-OR processing. Input data words of the truth table perform either EXCLUSIVE OR or NAND-OR-OR processing on partially recorded truth table input data word array with truth values "1". After logical operations have occurred, the output row photoconductor arrays are filled with the necessary patterns such that the truth table output data words can be reconstructed through the photoconductor arrays. The optical processors described in the two references hereabove mentioned, which are incorporated by reference, provided an advance in the prior art of the time insofar as they had a simple structure. Furthermore, the mapping relation existed for both the location addressable memory and the content addressable memory. Additionally, the truth table look up processing could be performed for either numerical arithmetic operations or boolean logic operations. However, in the Guest patent, the digital inputs and digital outputs are one-dimensional. There is no teaching in the Guest patent of any possibility to extend the computational methods to a two-dimensional input. Futhermore, the hologram recorded in the storage medium comprises solely the pattern of the corresponding truth table input pattern corresponding to the value 1 as an output value. Such hologram recording saves considerable space but can only allow logic operations on the digital inputs. Guest illustrates it with the use of the XOR and the NAND-OR-OR logical operations. The XOR operation, for instance, is performed by appropriately phase shifting between the reference beam and the object beam. When the number of digital inputs becomes large, severe problems arise in the recording of large truth-tables in the hologram, thereby limiting the use of the Guest processor to modest input sizes.

Another recent approach to optical truth table look-up processing has been disclosed in an article by Shing-Hon Lin, Thomas F. Krile and John F. Walkup, entitled "Optical triple-product processing in logic design", *Applied Optics*, Vol 25, no. 18, 1986, which is hereby incorporated by reference. In this article, triple-product processing is used to perform a generalized bilinear transform on two different input functions to produce the outputs of the truth table. Yet, the triple-product processor utilizes two input planes, thereby preventing the two-dimensional space bandwidth product from being fully used. An additional drawback resides in the lack of accuracy in the computation of the spectral mapping coefficients by the generalized bilinear transform for truth table mapping.

All the disadvantages hereabove described in connection with optical systems of the prior art are overcome by the optical system of the present invention. The system architecture according to the present invention is intrinsically a massively parallel logic device which can run at the highest possible speed permitted in operations of basic micro-level computing functions. The optical system of the present invention is equivalent to an optical two-dimensional, large-scale integrated circuit with at most a one- or two-gate delay. Not only can it run at extremely high speeds, but it obviates the problems caused by radiation and the spurious effects produced by electromagnetic field interferences.

SUMMARY OF THE INVENTION

The principal object of the present invention is to provide the transforms and the computational algorithms necessary to compute the spectral expansion vectors to be used in truth-table look-up processing.

Another object of the present invention is to find the linear or non-linear boolean basis vector corresponding to the spectral expansion vector that needs be implemented in the input plane of a optical holographic processor.

A further object of the present invention is to provide optical holographic processor architectures comprising a holographic storage medium susceptible to store the coefficients of the spectral expansion vector and which perform the mapping of digital input vectors into digital outputs by means of the spectral expansion vector. In the preferred embodiments of the present invention, the spectral expansion vector can be computed using a $\{0,1\}$ coding or a bipolar coding $\{-1,+1\}$.

A further object of the present invention is the use of the universal optical holographic processor of the present invention as the basic building block in future applications, such as optical digital computers and associated parallel processing computers. Such applications of the present invention will become all the more apparent as improvements will be made to optoelectronic gates which would greatly improve the input planes of the present invention.

The present invention discloses a truth-table look-up optical processor comprising means for detecting and coding an input light signal emitted by a light source, the coded light signal representing a plurality of digital input vectors of a binary truth-table; means for receiving the coded input light signal and for encoding the coded input light signal so as to transform the plurality of digital input vectors into a boolean basis vector, the boolean basis vector being derived from the plurality of digital input vectors in conformance with a predetermined transform; means for storing at least one hologram representing the product of the predetermined transform with the digital outputs of the binary truth-table, the product characterizing the spectral expansion vector of the digital outputs, the spectral expansion vector having coefficients which can be positive, negative or zero, the coded light signal encoded to form the boolean basis vector being incident upon the storing means; means for preforming the inner product of the spectral expansion vector with the boolean basis vector and for generating an output light signal corresponding to the digital outputs of the binary truth-table; and output means for receiving the output light signal exiting from the generating means.

The present invention also discloses a method for implementing a truth-table look-up optical processor comprising the steps of selecting a binary truth-table comprising a plurality of digital input vectors and a plurality of digital outputs; coding an input light signal so that the coded input light signal represents the digital input vectors; selecting a transform and performing the operation on the digital outputs by the transform so as to obtain a spectral expansion vector corresponding to the binary truth-table; generating from the digital input vectors so as to obtain a boolean basis vector corresponding to the digital input vectors; encoding the coded light signal so that the encoded light signal represents the boolean basis vector; performing the inner product of the spectral expansion vector with the boolean basis vector, the result of the inner product yielding the digital outputs of the binary truth-table; and outputting the encoded light signal after the boolean basis vector corresponding to the encoded light signal has undergone the inner product operation, the output light signal representing the digital outputs of the binary truth-table.

BRIEF DESCRIPTION OF THE DRAWINGS

A more complete appreciation of the invention will become apparent from a consideration of the following description taken in reference to the following drawings in which:

FIG. 2b shows the $2^n \times 2^n$ Rademacher-Walsh transform with $n=3$;

FIGS. 12a, 12b, 12c and 12d show the special encoding used in the input planes for the boolean basis vector (FIGS. 12a and 12c) and in the storage medium for the spectral expansion vector (FIGS. 12b and 12d) for a two-dimensional bipolar matrix multiplication processor as shown in FIG. 14;

FIGS. 15a, 15b, 15c and 15d show the special encoding used in the input planes for the boolean basis vector (FIG. 15a) and used in the storage medium for the spectral expansion vector (FIG. 15d) as well as the digital output in the form of a pixel (FIG. 15c) and in the output plane (FIG. 15d), this special encoding being used for the bipolar optical correlator of FIG. 16;

DESCRIPTION OF THE PREFERRED EMBODIMENTS OF THE INVENTION

In order to gain a full understanding of the architectures and of the algorithms disclosed in this specification, it will be useful to the reader to present the theoretical background underlying the present invention. The various computational transformations used in this disclosure the truth-table look-up processing will thus be described in the following theoretical discussion.

THEORETICAL BACKGROUND

Any combinatorial digital function can be expressed as a truth table representation, a Karnaugh map representation or a canonical form representation. By way of specific example, in the boolean binary domain, it will be assumed that a binary truth table with two stable states [0,1] contains m inputs of boolean variables and n outputs of boolean variables. The logical relationship between the inputs of the truth table $x_i$ and the output of the truth table $y_k$ can thus be defined by the following equation:

$$y_k = f_k(x_1, x_2, \ldots, x_m), x_i \text{ element of } \{0,1\}, i=1, \ldots m. \quad (1)$$

For the jth truth table, equation (1) can be rewritten as follows:

$$y_{kj} = f_{kj}(x_{1j}, x_{2j}, \ldots, x_{mj}), x_{ij} \text{ element of } \{0,1\} \quad (2)$$

wherein $1 < k <= n, 1 < j <= N$ m is the number of input elements in a truth table;
n is the number of output elements in a truth table;
N is the total number of truth tables.

Figure 1:
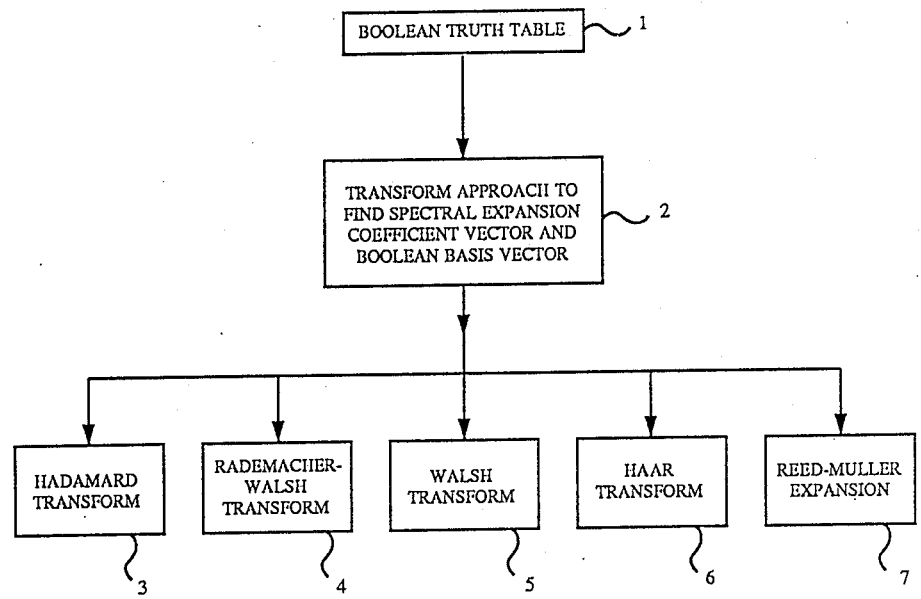
FIG. 1 shows the computational structure chart representing the various transforms used in implementing a truth-table look-up processor according to the present invention.

Boolean truth table mapping encompasses a very broad range of the boolean spectrum. For example, for m inputs of a binary truth table, there exists $2^{2^m}$ different combinations of truth table outputs. In order to implement truth table look-up processing in an optical system, the computational algorithm must find the boolean basis vector in order to perform the linear operation with the corresponding spectral expansion vector. In most cases, the boolean basis vector is derived from the nonlinear boolean operation among the truth table input variables. Reference is now made to FIG. 1 which illustrates in a schematic fashion the various subcategories derived from Boolean truth table mapping. Various transforms which will be described hereinafter are represented in FIG. 1 and have been developed to find the spectral expansion vector, as schematized in the steps 1 and 2. In the preferred embodiments of the present invention, Walsh transforms, represented by the boxes 3,4,5, the Haar transform (box 6) and the Reed-Muller expansion (box 7) form the basis to compute the spectral expansion vector of a binary truth table. Further details can be found in the following references, copies of which are hereby incorporated by reference. These reference articles are the following: "A transform approach to logic design", by R. Lechner, *IEEE transaction on Computers*, Vol C-19, No. 7, July 1970; "The application of the Rademacher-Walsh transform to boolean classification", by C. Edwards, *IEEE transaction on computers*, Vol C-24, No. 1, January 1975; and "A note on minimal Reed-Muller canonical forms of switching functions", *IEEE Transactions on Computers*, March 1977. The transforms hereabove mentioned have been heretofore studied for their interesting mathematical properties but have found limited applications in analog devices. It is furthermore believed by applicant that they have never been used to implement truth-table look-up optical processing and more particularly to find the spectral expansion vector according to the following relation:

$$f(x_1, x_2, x_3, \ldots, x_m) = (x_0, x_1, x_2, \ldots, x_m, \ldots, x_1 @ x_2, \ldots, x_1 @ x_2 @ \ldots @ x_m) \begin{pmatrix} S_0 \\ S_1 \\ S_2 \\ \cdot \\ \cdot \\ S_5 \\ \cdot \\ \cdot \\ S_l \end{pmatrix}$$

where $(S_0, S_1, \ldots, S_l)$ is the spectral expansion column vector; $(x_0, x_1, \ldots, x_1 @ x_2 @ x_3 \ldots @ x_m)$ is the boolean basis row vector; and @ is the boolean operator.

Different boolean operators exist in different transforms and the sequences of these boolean basis vectors must match with the corresponding transforms. Various computational algorithms have been implemented, for instance, for transforming a m vector truth table over the 2 element Galois field GF (2)=[0,1] into a spectral domain. By means of the appropriate matrix multiplication or spectral expansion method, the necessary computational procedure results in no loss of information of the original boolean domain. Conversely, such a procedure allows the inverse transformation to convert back to the boolean domain.

The following theorem summarizes in a mathematical but concise way the underlying theoretical fundamentals of the methods and embodiments disclosed in the present invention.

Theorem: If $y = f(x_i)$ is a truth table representation of the binary truth table input variables $x_i$, where $i = 1,2,3, \ldots, m$ then the following relations hold true:

$$[Y] = \sum_{p=0}^{2^m-1} [X_p(x_i)] \otimes [S(W)] \quad \text{or} \quad [Z] = \sum_{p=0}^{2^m-1} [r_p(z_i)] \otimes [R(W)] \quad \text{and}$$

$$[S(W)] = \frac{1}{2^m} [T^m][Y] \qquad [R(W)] = \frac{1}{2^m} [T^m][Z]$$

$$z_i = 1 - 2x_i, \text{ where } i = 0 \text{ to } 2^m - 1$$

where
[$T^m$] is the appropriate 2×2 discrete orthogonal transform;
$x_i$ is the truth table boolean variables using a {0,1} coding;
$z_i$ is the truth table boolean variables using a {−1,+1} coding;
$X_p(x_i)$ is the boolean basis vector using a {0,+1} coding;
$R_p(z_i)$ is the boolean basis vector using a {−1,+1} coding;
S(W) denotes the spectral expansion vector using a {0,+1} coding;
R(W) denotes the spectral expansion vector using a {−1,+1} coding;
[Y] and [Z] are the digital outputs of the truth-table using respectively a {0,+1} coding and a {−1,+1} coding;
⊗ is the inner product operation The Walsh transforms appear to be of particular interest. In order to more fully understand the present invention, these particular transforms will be described in greater details. Several different sequence orderings of the rows of Walsh orthogonal matrices lead to a set of transforms well known in the art under the names of: (1) Hadamard transform (or Walsh-Hadamard transform) (2) Rademacher-Walsh transform (3) Walsh transform (or Walsh-Kaczmarz transform). Although the sequence orderings of these different orthogonal transforms are different, the information contests are identical for all of them.

Hadamard Transform

This transform, also called Walsh-Hadamard transform, is a discrete orthogonal transform in which the following relation holds:

$$W^{n+1} = \begin{bmatrix} W^n & W^n \\ W^n & -W^n \end{bmatrix}$$

This transform is considered to be symmetric and the inner product of any two matrix rows have the orthogonal property.

The following example of truth table will elucidate how the Hadamard transform actually operates on truth tables. By way of specific example, given a three variable truth table, the output of the truth table forms the column vector as indicated by f(x) in the chart hereinbelow. Bipolar coding {+1,−1} is performed on f(x) to yield f(z).

| $x_1$ | $x_2$ | $x_3$ | f(x) | f(z) |
|---|---|---|---|---|
| 0 | 0 | 0 | 0 | +1 |
| 0 | 0 | 1 | 1 | −1 |
| 0 | 1 | 0 | 1 | −1 |
| 0 | 1 | 1 | 1 | −1 |
| 1 | 0 | 0 | 1 | −1 |
| 1 | 0 | 1 | 1 | −1 |
| 1 | 1 | 0 | 1 | −1 |
| 1 | 1 | 1 | 0 | +1 |

$$S(W) = \frac{1}{2^3} \begin{bmatrix} +1 & +1 & +1 & +1 & +1 & +1 & +1 & +1 \\ +1 & -1 & +1 & -1 & +1 & -1 & +1 & -1 \\ +1 & +1 & -1 & -1 & +1 & +1 & -1 & -1 \\ +1 & -1 & -1 & +1 & +1 & -1 & -1 & +1 \\ +1 & +1 & +1 & +1 & -1 & -1 & -1 & -1 \\ +1 & -1 & +1 & -1 & -1 & +1 & -1 & +1 \\ +1 & +1 & -1 & -1 & -1 & -1 & +1 & +1 \\ +1 & -1 & -1 & +1 & -1 & +1 & +1 & -1 \end{bmatrix} \begin{bmatrix} +1 \\ -1 \\ -1 \\ -1 \\ -1 \\ -1 \\ -1 \\ +1 \end{bmatrix} = \frac{1}{8} \begin{bmatrix} -4 \\ 0 \\ 0 \\ 4 \\ 0 \\ 4 \\ 4 \\ 0 \end{bmatrix}$$

The Walsh-Hadamard transform is then applied to the column vector f(z). The multiplication of this vector by this matrix yields the spectral expansion vector, as summarized in the calculations set forth below:

$$f(z) = \frac{1}{8}(-4, 0, 0, 4, 0, 4, 4, 0) \begin{pmatrix} R_0 \\ R_3 \\ R_2 \\ R_2R_3 \\ R_1 \\ R_1R_3 \\ R_1R_2 \\ R_1R_2R_3 \end{pmatrix} \text{ in } \{+1, -1\} \text{ coding}$$

or $$f(x) = \frac{1}{8}(0, 0, 0, 4, 0, 4, 4, 0) \begin{pmatrix} 1 \\ x_3 \\ x_2 \\ x_2 \oplus x_3 \\ x_1 \\ x_1 \oplus x_3 \\ x_1 \oplus x_2 \\ x_1 \oplus x_2 \oplus x_3 \end{pmatrix} \text{ in } \{0, 1\} \text{ coding}$$

It should be noted that in the above computations, the conversion relation between the bipolar coding {+1,−1} and the {0,1} coding is simply given by the following equation:

$$f(z) = 1 - 2f(x)$$

or in terms of each output element:

$$z_i = 1 - 2x_i, \text{ for } i = 1, \ldots, m.$$

Furthermore, the mathematical multiplication of {+1,−1} is equivalent to an EXCLUSIVE-OR operation of the {0,1+} coding. In other words, $1 \times -1 = -1$ is simply equivalent to $0 \oplus 1 = 1$. Accordingly, the boolean basis vector $(R0, R1, R2, \ldots, R1R2R3)$ in bipolar operation is equivalent to $(1, \chi_1, \chi_2, \ldots, \chi_1 \oplus \chi_2 \oplus \chi_3) = (\chi_0, \chi_1, \chi_2, \ldots, \chi_1 \oplus \chi_2 \oplus \chi_3)$ using the $\{0,1\}$ coding.

Rademacher-Walsh transform

The Rademacher-Walsh transform is another Walsh transform in which the matrix coefficients have been rearranged in a different order. Such a rearrangement does not affect the orthogonal property of discrete orthogonal matrices. Typically denoted by Rad(j,k), where k varies between 0 and 1, the Rademacher function wherefrom is derived the Rademacher transform is by definition given by the following equation:

$$Rad(j,k) = \text{sign} \{\sin 2j \, k\} \, 1.0 \text{ where } k=0, \ldots, 1$$

Figure 2A:
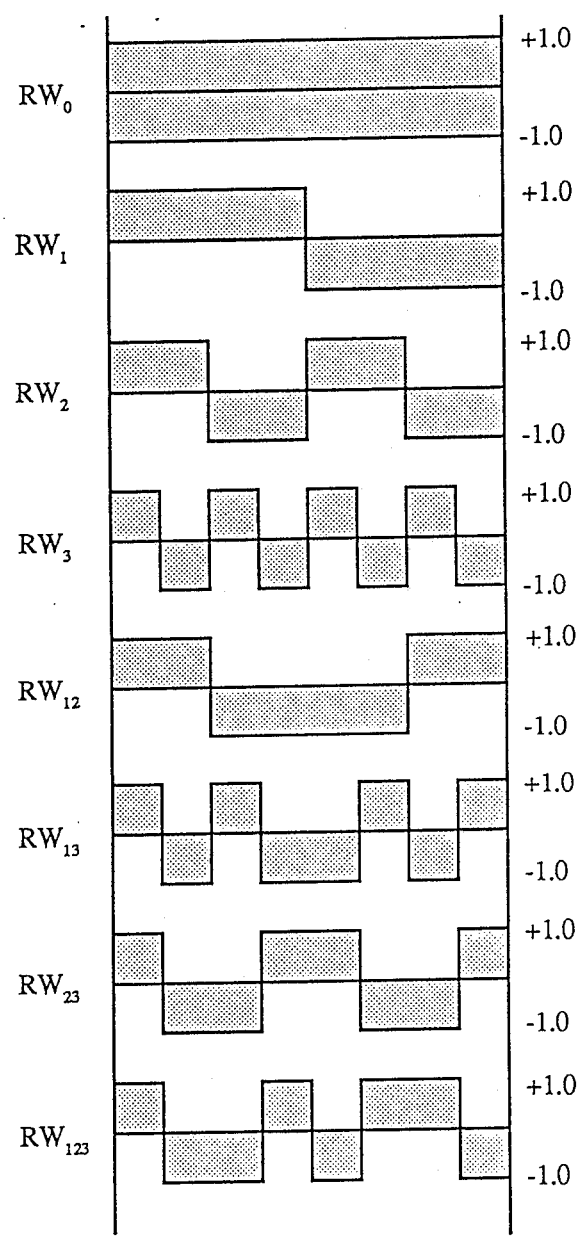
FIG. 2a shows the complete orthogonal set of Rademacher functions for $n=3$, generated from the Rademacher basis function.

The Rademacher function forms the basic sequence of the Rademacher-Walsh transform. The complete orthogonal set of Rademacher functions is shown in FIG. 2(a), and the Rademacher-Walsh transform itself is shown in FIG. 2(b) for n=3. Using the three variable truth table defined in the previous example for Hadamard transforms, the same computational procedure yields the following results. The truth table output f(z) or f(x) can be expressed as:

$$f(z) = \frac{1}{8} (-4, 0, 0, 0, 4, 4, 4, 0) \begin{pmatrix} R_0 \\ R_1 \\ R_2 \\ R_3 \\ R_1R_2 \\ R_1R_3 \\ R_2R_3 \\ R_1R_2R_3 \end{pmatrix}$$

using a $\{-1,+1\}$ coding. This is equivalent to $$f(x) = \frac{1}{8} (0, 0, 0, 0, 4, 4, 4, 0) \begin{pmatrix} 1 \\ x_1 \\ x_2 \\ x_3 \\ x_1 \oplus x_2 \\ x_1 \oplus x_3 \\ x_2 \oplus x_3 \\ x_1 \oplus x_2 \oplus x_3 \end{pmatrix}$$

using a $\{0,1\}$ coding.

Walsh-Kaczmarz Transform

The Walsh function Wal(j,k) can be considered as being composed of Rademacher functions. The following definition clearly illustrates this relation.

Wal(0,k) = Rad(0,k) = 1;

Wal(1,k) = Rad(1,k);

Wal(2,k) = Rad(1,k)Rad(2,k);

Wal(3,k) = Rad(2,k);

Thus, taking the Rademacher functions as a basis set, the complete set of Walsh functions is the multiplicative closure of the set of Rademacher functions, which give another class of orthogonal transforms, called Walsh transforms (or Walsh-Kaczmarz transforms.)

The same computational procedure used for the previous three variable truth table yields the following results for the table output:

$$f(z) = \frac{1}{8} (-4, 0, 4, 0, 4, 0, 4, 0) \begin{pmatrix} R_0 \\ R_1 \\ R_1R_2 \\ R_2 \\ R_2R_3 \\ R_1R_2R_3 \\ R_1R_3 \\ R_3 \end{pmatrix}$$

using a $\{-1,+1\}$ coding. This is equivalent to:

$$f(x) = \frac{1}{8} (0, 0, 4, 0, 4, 0, 4, 0,) \begin{pmatrix} 1 \\ x_1 \\ x_1 \oplus x_2 \\ x_2 \\ x_2 \oplus x_3 \\ x_1 \oplus x_2 \oplus x_3 \\ x_1 \oplus x_3 \\ x_3 \end{pmatrix}$$

using a $\{0,1\}$ coding.

It should be noted, however, that the above examples are all in the positive number regions. Yet, not all the spectrum vectors are in the positive number region. Some of the spectrum vectors must therefore perform the truth table mapping in the negative number region. If one assumes a three variable truth table boolean function $f_2(x) = x_1, x_2, x_3 + \bar{x}_2$, the Rademacher-Walsh spectrum can be derived as shown hereinbelow:

| $x_1$ | $x_2$ | $x_3$ | $f_2(x)$ | $f_2(z)$ |
|---|---|---|---|---|
| 0 | 0 | 0 | 1 | −1 |
| 0 | 0 | 1 | 1 | −1 |
| 0 | 1 | 0 | 0 | 1 |
| 0 | 1 | 1 | 0 | 1 |
| 1 | 0 | 0 | 1 | −1 |
| 1 | 0 | 1 | 1 | −1 |
| 1 | 1 | 0 | 0 | 1 |
| 1 | 1 | 1 | 1 | −1 |

$S(W) = \frac{1}{8}(-2, 2, -6, 2, -2, -2, -2, 2)$ so that $f(z) = 1/8 \, (-2, 2, -6, 2, -2, -2, -2, 2) \begin{pmatrix} R_0 \\ R_1 \\ R_2 \\ R_3 \\ R_1R_2 \\ R_1R_3 \\ R_2R_3 \\ R_1R_2R_3 \end{pmatrix}$ and where $R0 = 1$, $R1$, $R2$, $R3$ is $x1$, $x2$, $x3$ in $\{+1, -1\}$ coding and $$f(z) = 1 - 2 f(x), \; z_i = 1 - 2 \, x_i$$

All the transforms mentioned above are Walsh orthogonal transforms. There are alternative orthogonal transforms which may be deployed for the transformation of digital data into the spectral domain. This class of transforms is not a variant of the Hadamard transforms or of the Rademacher-Walsh transforms which would undergo a rearrangement of rows or columns. Yet, these transforms are useful alternative means of computation for spectral vectors. The most important ones are the Haar transform and the Reed-Muller expansion.

Haar transform

The Haar transform is defined as follows:

$$H_0^0(t) \triangleq +1$$

$$H_i^q(t) = \begin{cases} +\sqrt{2^{i-1}} & \text{for } \frac{q}{2^{i-1}} \leq t \leq \frac{q + \frac{1}{2}}{2^{i-1}} \\ -\sqrt{2^{i-1}} & \text{for } \frac{q + \frac{1}{2}}{2^{i-1}} \leq t \leq \frac{q+1}{2^{i-1}} \\ 0 & \text{otherwise} \end{cases}$$

where
$i = 1, 2, \ldots, n$
$q = 0, 1, \ldots, 2^{i-1} - 1$

Figure 3A:
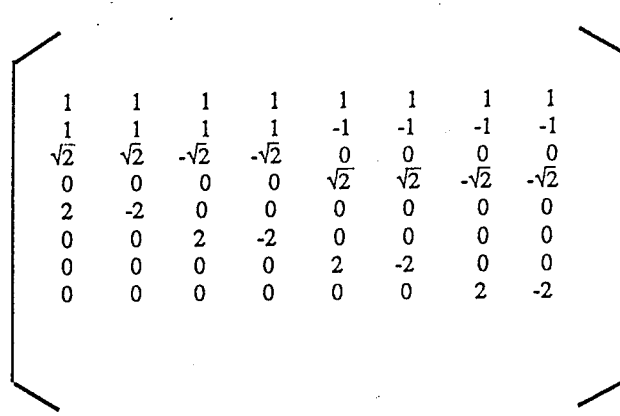
FIG. 3a shows the $2^n \times 2^n$ Haar transform with $n=3$.

The Haar transform is confined in the range of $\{0, +2\}$ where $N = 0, 1, 2, \ldots$. This set of Haar transforms for any n constitutes a complete set of orthogonal transforms. The inverse of the Haar transform is given by the orthogonal transform relation:

$$[H]^{-1} = \frac{1}{K} [H]^h$$

where K is a scaling constant and $[H]^h$ represents the hermitian conjugate matrix of the Haar transform. Using the above-definition, a Haar transform of $2^n \times 2^n$ where $n = 3$ is shown in FIG. 3(a).

Figure 3B:
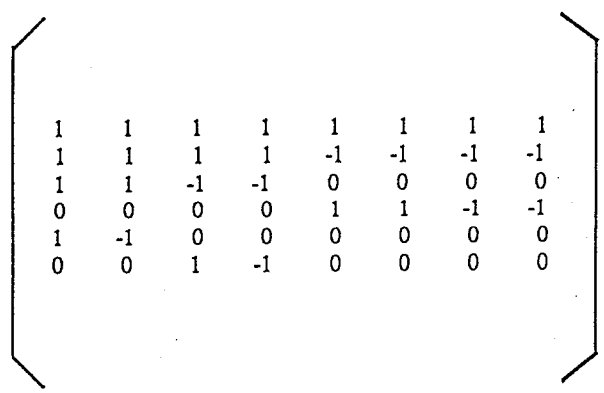
FIG. 3b shows the $2^n \times 2^n$ normalized Haar transform with $n=3$.

Since the spectral expansion vector represents the correlation between the xi inputs and a combination of the xi inputs and the outputs of the truth table function, it is appropriate to rescale the Haar function to a normalized value $\{0, +1\}$. A normalized Haar transform of $2^n \times 2^n$, where $n = 3$ is shown in FIG. 3(b). However, with these normalized values, the relation yielding the inverse transform $$[H]^{-1} = \frac{1}{K} [H]^h$$

no longer holds true. In order to compare with Walsh orthogonal transforms, the same three variable truth table used in connection with the presentation of the Walsh transforms will be employed. If one assumes that the normalized Haar transform is $[H]_n$, then the corresponding Haar transform spectral expansion vector can be expressed as $$[H]_n[f(z)] = [h(\omega)],$$

so that the following relations hold true:

$$\begin{bmatrix} +1 & +1 & +1 & +1 & +1 & +1 & +1 & +1 \\ +1 & +1 & +1 & +1 & -1 & -1 & -1 & -1 \\ +1 & +1 & -1 & -1 & 0 & 0 & 0 & 0 \\ 0 & 0 & 0 & 0 & +1 & +1 & -1 & -1 \\ +1 & -1 & 0 & 0 & 0 & 0 & 0 & 0 \\ 0 & 0 & +1 & -1 & 0 & 0 & 0 & 0 \\ 0 & 0 & 0 & 0 & +1 & -1 & 0 & 0 \\ 0 & 0 & 0 & 0 & 0 & 0 & +1 & -1 \end{bmatrix} \begin{bmatrix} -1 \\ -1 \\ +1 \\ +1 \\ -1 \\ -1 \\ +1 \\ -1 \end{bmatrix} = \begin{bmatrix} -2 \\ +2 \\ -4 \\ -2 \\ 0 \\ 0 \\ 0 \\ 2 \end{bmatrix}$$

$$f(z) = \frac{1}{8}(h_0, h_1, h_2, h_3, h_4, h_5, h_6, h_7) \begin{pmatrix} 1 \\ z_1 \\ 2z_2 \\ 2z_3 \\ 4z_4 \\ 4z_5 \\ 4z_6 \\ 4z_7 \end{pmatrix}$$

$$= \frac{1}{8}(-2, 2, -4, -2, 0, 0, 0, 2) \begin{pmatrix} 1 \\ z_1 \\ 2z_2 \\ 2z_3 \\ 4z_4 \\ 4z_5 \\ 4z_6 \\ 4z_7 \end{pmatrix}$$

where $f(z) = 1 - 2 f(x)$ $z1 = 1 - 2\ x1$ $z2 = 1 - 2\ (\overline{x1}.x2)$ $z3 = 1 - 2\ (x1.x2)$ $z4 = 1 - 2\ (\overline{x1}.\overline{x2}.x3)$ $z5 = 1 - 2\ (\overline{x1}.x2.x3)$ $z6 = 1 - 2\ (x1.\overline{x2}.x3)$ $z7 = 1 - 2\ (x1.x2.x3)$ Thus, f(z) can be simplified to the following relation:

$$f(z) = 1/8(-4, -4, 16, 8, -16) \begin{pmatrix} 1 \\ x_1 \\ \overline{x}_1 x_2 \\ x_1 x_2 \\ x_1 x_2 x_3 \end{pmatrix}$$

Reed-Muller expansion

Another set of transforms, the so-called Reed-Muller expansion, has also been found to be of particular interest of truth-table look-up optical processing systems.

The Reed-Muller expansion is known by mathematicians. Reference is made more particularly to the article entitled "A note on minimal Reed-Muller canonical forms of switching functions", by K. L. Kodanpani and Rangaswamy V. Setlur, *IEEE Transactions on Comput-* ers, March 1977. Unlike the method using discrete orthogonal transforms hereabove described, the Reed Muller expansion of truth tables cited in this article forms a non-orthogonal expansion. The Reed Muller expansion is the digital equivalent expansion of the Taylor series expansion for continuous functions.

The difference of any boolean function f(x) with respect to the boolean variable $x_j$ is given by $$df\omega/d\chi_j = f(\chi_0,\chi_1, \ldots, \bar{\mathrm{i}}\mathrm{j}, \ldots \chi_n) \oplus f(\chi_0,\chi_1, \ldots, \chi_j, \ldots \chi_n)$$

Hence, the Reed Muller expansion of m inputs truth table can be expressed as $$f(x) = \frac{1}{2^m}\left(\bigoplus_{i=0,m-1}[1 - 2x_i^{(hi)}]\right)\left(\bigoplus_{i=0,m-1}\begin{bmatrix}1 & 1 \\ (-1)^{hi} & (-1)^{hi}\end{bmatrix}\right)[Y]$$

where $\bigoplus_{i=0,m-1}$ is the right Kronecker product of $m$ matrices of the same form and where: $x_i^{(hi)} = x_i \oplus hi$, $x_i^{(o)} = x_i$, $H = (h_0, h_1, \ldots, h_{m-1})$ is a fixed point at which the given function is expanded. [Y] is the truth table column vector, "—" in the expansion is the arithmetic subtraction. Given the three variable truth table example used hereabove, the expansion at H=(0,0,0) can be derived as follows:

$$f_3(x) = \frac{1}{2^3}([1(1 - 2x_1)] \oplus [1(1 - 2x_2)] \oplus [1 -$$

$$(1 - 2x_3)]\left(\begin{bmatrix}1 & 1 \\ 1 & -1\end{bmatrix}\begin{bmatrix}1 & 1 \\ 1 & -1\end{bmatrix}\begin{bmatrix}1 & 1 \\ 1 & -1\end{bmatrix}\right)[Y]$$

| $x_1$ | $x_2$ | $x_3$ | $f(x)$ |
|---|---|---|---|
| 0 | 0 | 0 | 1 |
| 0 | 0 | 1 | 0 |
| 0 | 1 | 0 | 0 |
| 0 | 1 | 1 | 1 |
| 1 | 0 | 0 | 0 |
| 1 | 0 | 1 | 1 |
| 1 | 1 | 0 | 1 |
| 1 | 1 | 1 | 1 |

$$f_3(x) = 1 - x_3 - x_1 - x_2 + 2x_2 \cdot x_3 +$$
$$2x_1 \cdot x_2 + 2x_1 \cdot x_3 + 3x_1 \cdot x_2 \cdot x_3$$

$$= (1, -1, -1, -1, 2, 2, 2, 3)\begin{pmatrix}1 \\ x_3 \\ x_2 \\ x_1 \\ x_3 \cdot x_2 \\ x_1 \cdot x_2 \\ x_1 \cdot x_3 \\ x_1 \cdot x_2 \cdot x_3\end{pmatrix}$$

DETAILED DESCRIPTION

Figure 4:
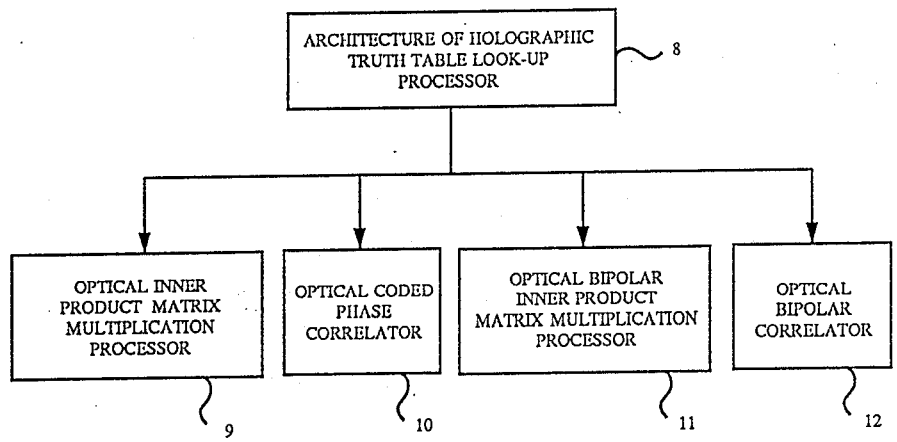
FIG. 4 is a block diagram showing the different architectures implemented in the holographic truth-table look-up processor of the present invention.

Four basic preferred embodiments of the invention implementing a two dimensional truth table look-up processor are disclosed herein. This is schematically illustrated in the block-diagram represented in FIG. 4. The present invention contemplates two types of inner product: the matrix multiplcation and the correlation function. Yet, it will be apparent to the person skilled in the art that other types of inner product can be envisioned such as the convolution product if appropriate optical elements are used to perform such a product. Furthermore, the spectrum vectors may be in the negative domain. If such is the case, the coding must be performed in the bipolar set $\{-1,+1\}$ rather than the field $\{0,+1\}$ (bipolar coding). The combination of the coding possibilities and of the inner product alternatives generates four cases embodied in the four preferred embodiments of the present invention (boxes 9,10,11 and 12 in FIG. 4).

Theoretically any optical matrix multiplier or optical correlator can perform the inner product operation. As shown in the theoretical discussion set forth hereabove, the mapping relation can be decomposed into two vectors, the boolean basis vectors Ri and the spectral expansion vectors Si. Such decomposition is valid for both linear and nonlinear truth table mapping. The output vectors can be expressed in matrix form [O]=[R][S]:

$$O_{mq} = \sum_{n=1}^{N} R_{mn} S_{nq}$$

$$= \begin{pmatrix} R_{11} R_{12} \ldots R_{1N} \\ \cdot \\ \cdot \\ \cdot \\ R_{m1} R_{m2} \ldots R_{mN} \end{pmatrix}\begin{pmatrix} S_{11} S_{12} \ldots S_{1p} \\ S_{21} S_{22} \ldots S_{2p} \\ \cdot \\ \cdot \\ \cdot \quad S_{pq} \end{pmatrix}$$

where m=1,2,3, ... M and q=1,2, ... G.

For the optical coded phase correlator implementation, the spectral expansion vectors form a unique mapping between the input variables and the output variables. If one supposes that a set (R1,S1), (R2,S2), (R3,S3), ... (Rn,Sn) Boolean truth table mappings exists, each Si consists of $2^m$ spectral expansion vectors for m inputs of truth table, every expansion coefficient being in the positive number region. These sets of spectral expansion vectors, after being Fourier transformed, may perform the two dimensional correlation function after all the mapping functions of each binary vector and for each truth table have been verified in the positive number region.

In a two dimensional coherent optical correlator, let the output be a two dimensional array, represented by O (x',y'), and let the input be a two dimensional array represented by R(x,y). The complex spatial filter is further represented by S(x-x',y-y'). Hence the following relation holds:

$$O(x',y') = \int\int R(x,y) S(x-x',y-y') dx dy$$

In other words, the output function O(x',y') represents the two dimensional n×N truth table output array. R(x,y) represents the two dimensional $2^m$×N truth table input array and S(x-x',y-y') represents the $2^m$×n×N spectral expansion vectors, Fourier transformed and stored in the holographic medium on the filter plane. In a simple matrix form, o=[S]r, where r represents the column vectors of [R], and the vectors o are the column vectors of [O]. The inner product of two vectors is equivalent to a cross correlation operation evaluated for a zero relative shift of the two functions being correlated, where [S] is the four dimensional tensor matrix of spectral expansion vectors.

However, if the spectral expansion vectors are not all in positive number regions, an optical matrix multiplication must be performed in the optical bipolar processor. Equation (3) can be expressed as $$Omq = (Omq+) - (Omq-) \qquad (4)$$

where $Omq+$ is the sum of the positive values resulting from the matrix multiplication; and $Omq-$ is the sum of the negative values resulting from the matrix multiplication. If the results of the matrix multiplication indicate that $Omq+$ is greater than $Omq-$, the multiplication result $Omq$ is positive. This result is equivalent to binary logic 0, otherwise, if the multiplication result is negative ($Omq+ < Omq-$), the result is equivalent to binary logic 1.

Figure 5A:
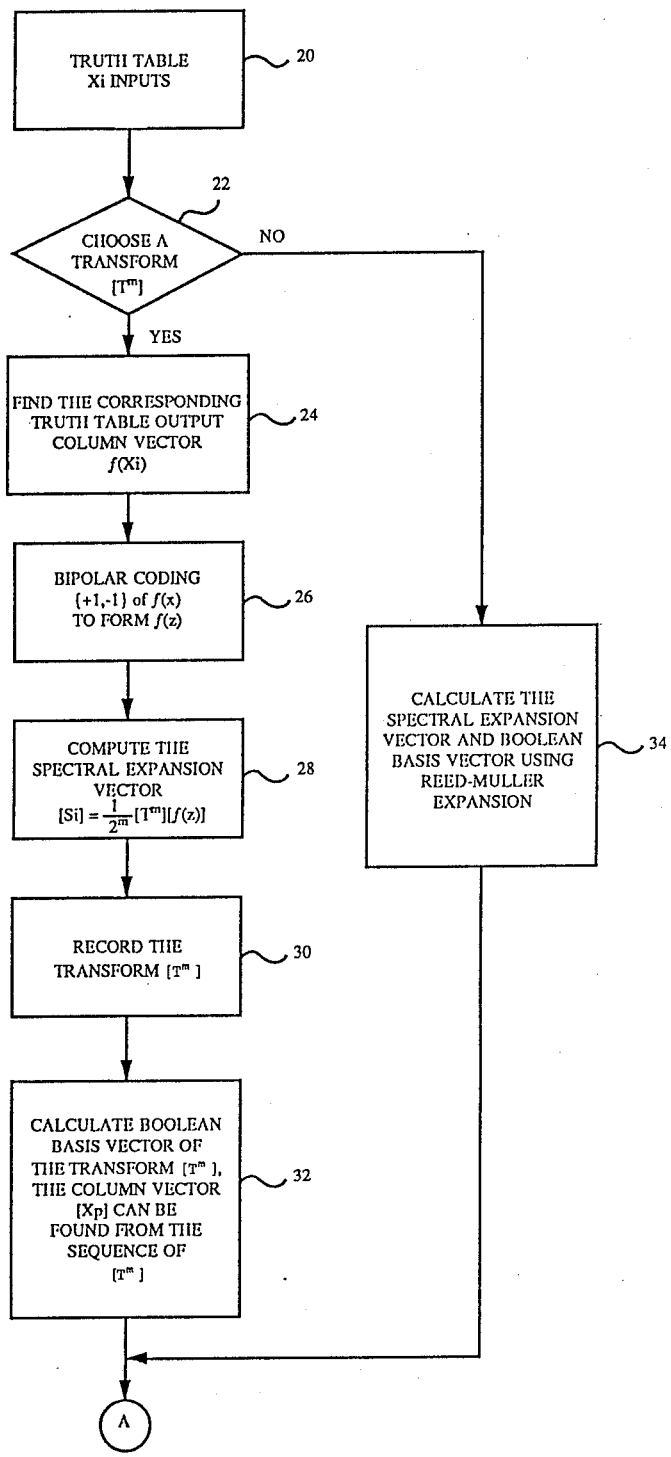
FIG. 5a shows the first half of a computational flow diagram illustrating the method for implementing a turth-table look-up optical processor according to the present invention.
Figure 5B:
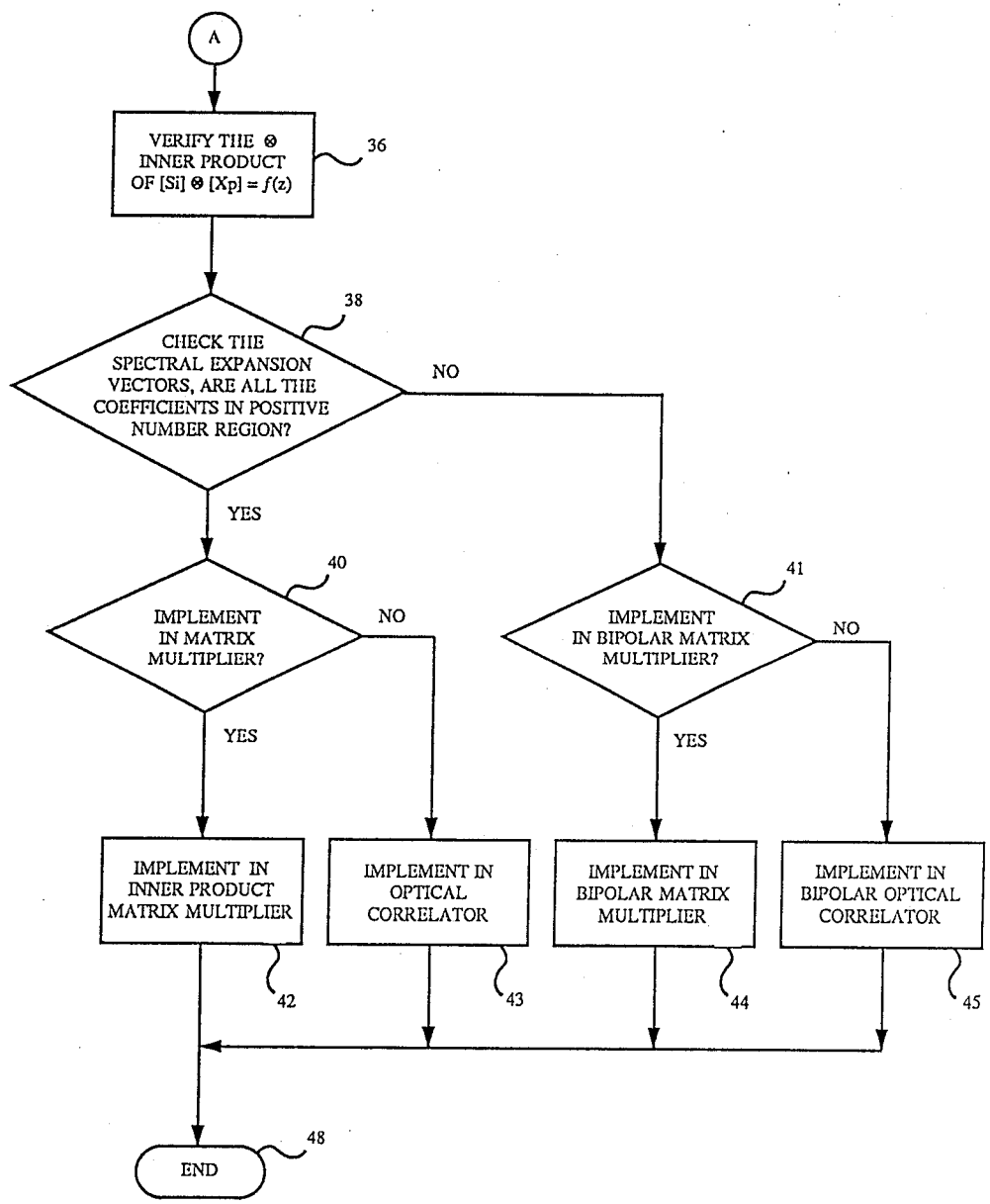
FIG. 5b is the second half thereof

FIG. 5 illustrates a computational flow diagram whose purpose is to compute the spectral expansion vector used in the truth table mapping of the present invention. As the truth table look-up processing is a nonlinear mapping relation, the computational procedure of the present invention is to provide an efficient method to separate the linear spectral expansion vector from the nonlinear boolean basis vector. Referring to FIG. 5 again, the nonlinear boolean basis vector of xi can be computed from the sequence of the transform selected (box 32). It will be apparent to the person skilled in the art that for different sequences of transforms, the nonlinear boolean basis vectors are different. After choosing the transform 22, the corresponding spectral vector 28 can be computed after finding the cooresponding truth table output column 24 and performing the proper encoding 26 (the coding $\{-1,+1\}$ is illustrated in FIG. 5 by way of specific example). The corresponding boolean basis vector 32 can thus be determined. Finally, these two vectors 28 and 32 must verify the inner product 36 so as to check for the cross correlation operation. If all spectrum coefficients can be realized in positive number region (step 38), the process is implemented in an optical correlator (step 40) and either the optical matrix multiplier 42 or the coded phase optical correlator 43 can be used. Otherwise, it must be implemented in a bipolar optical processor (step 41) and either the bipolar matrix multiplier (44) or the optical bipolar correlator (45) must be used for truth table look-up processing.

Figure 6A:
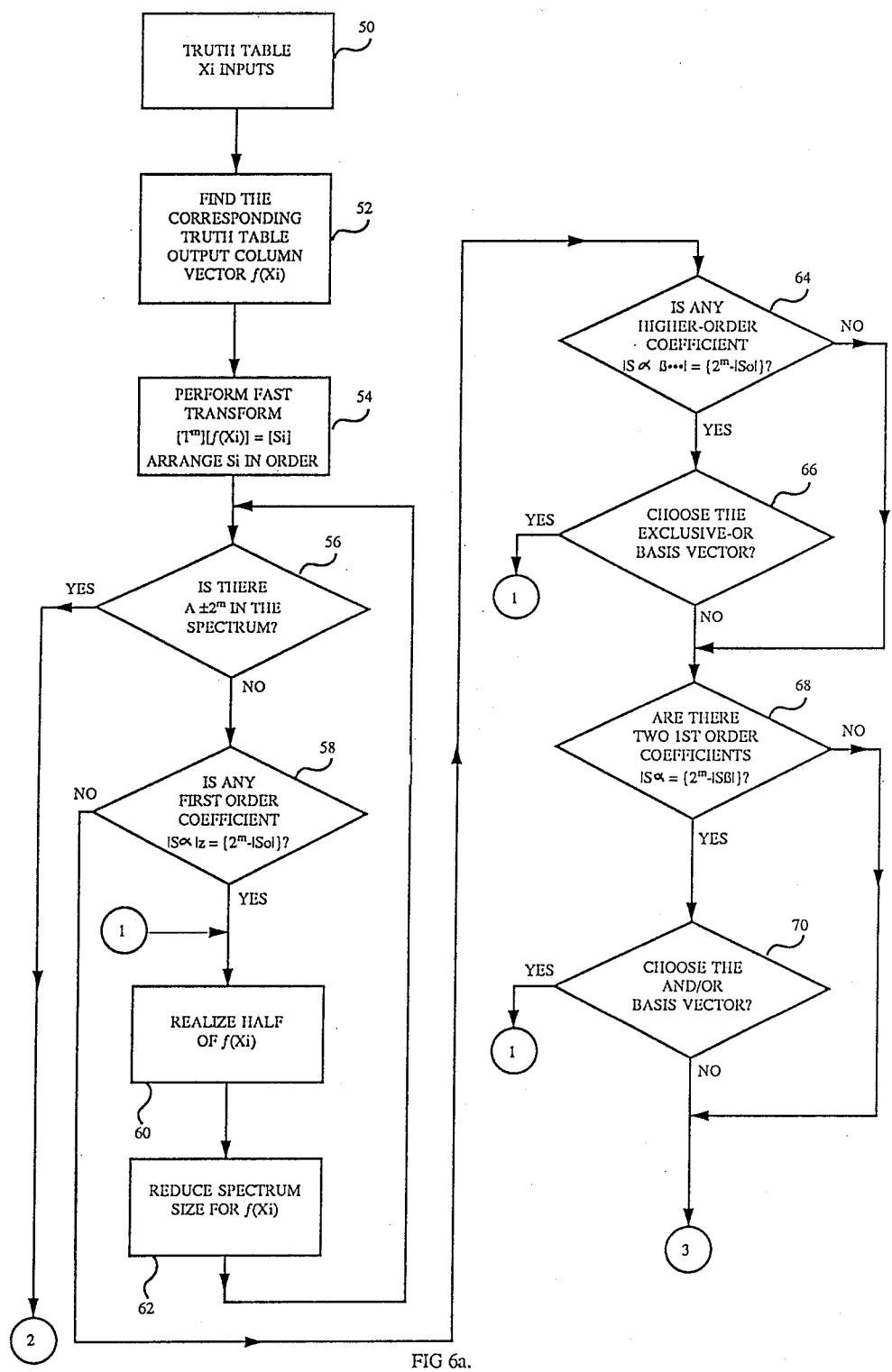
FIG. 6a is the first half of a more detailed computational flow diagram illustrating the computation of the spectral expansion vector.
Figure 6B:
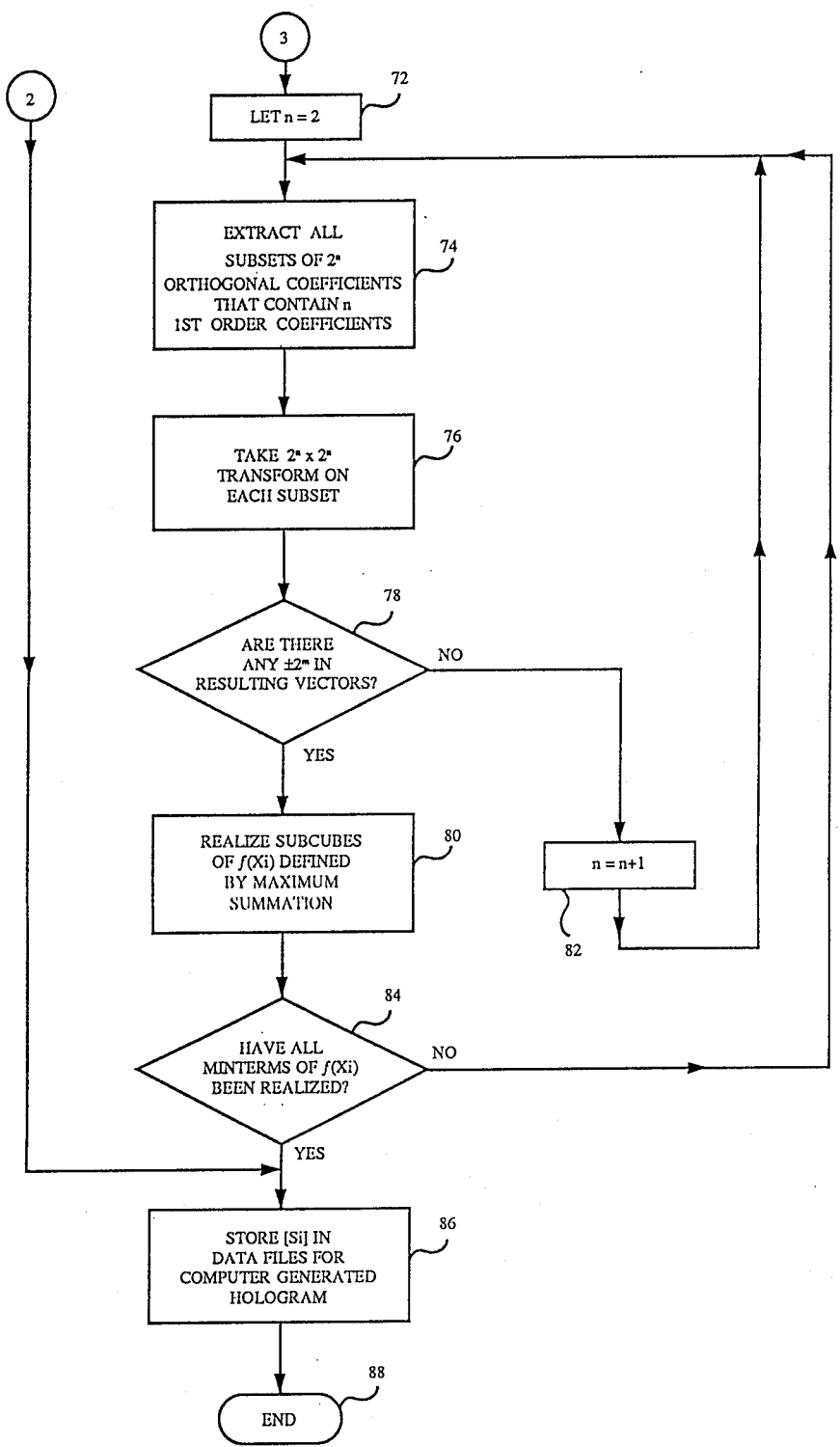
FIG. 6b in the second half thereof

FIG. 6 illustrates a more detailed computational flow diagram for computing the spectral expansion vector according to the present invention. FIG. 6 can be better comprehended in light of the following article entitled "Spectral Summation techniques for the synthesis of digital logic networks", by A. M. Lloyd and S. L. Hurst, *Proceedings of IEEE International Conference, Manufacture Electronics,* Computer Systems, pp. 66–70, 1979. This article is hereby incorporated by reference.

After finding the corresponding truth table output column vector (step 52), this vector is multiplied by the preselected transform (step 54). A series of steps indicated in detail in FIG. 6 (steps 56–84) and clearly commented in the aforementioned article allows the computation of the spectral expansion (step 86). The spectral expansion is then stored in the computer-generated hologram (step 86) which concludes the computation of that spectral expansion (step 88).

Optical Coded Phase Correlator

Figure 7:
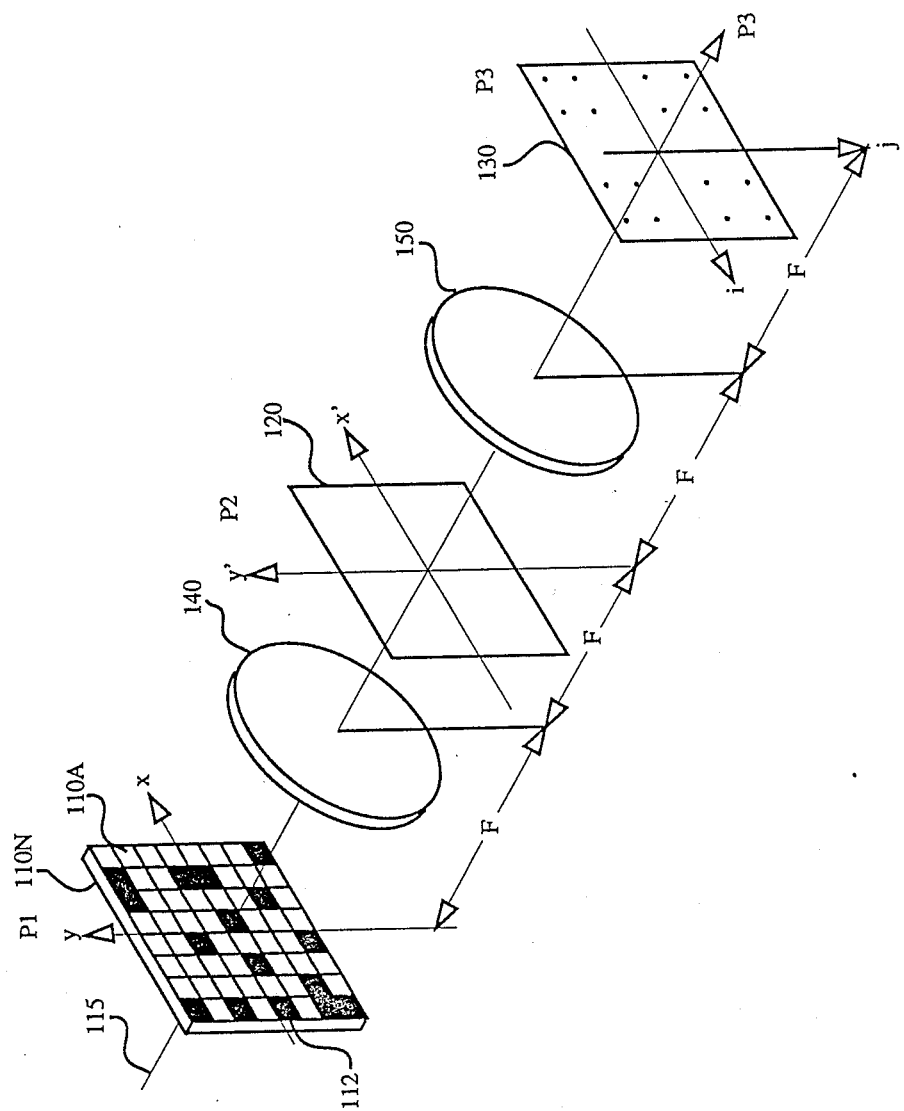
FIG. 7 illustrates the first embodiment of the present invention representing a coded phase optical correlator.

Reference is now made to FIG. 7 which shows a preferred embodiment of the present invention embodying a coded phase optical correlator implementation of truth table look-up processing. A two dimensional source array 110 forms the input plane P1. The source array 110 includes a plurality of two dimensional arrays 110A through 110N composed of a multiplicity of pixels 112. A coherent light signal 115 is directed through the source array 110 is first imaged by a Fourier transform lens 140 whereafter it impinges on the surface of a computer-generated hologram 120 at plane P2. The light signal 115 through a second Fourier transform lens 150 and generates the correlation points on the detector array 130 at plane P3. The CCD detector array 130 is on the plane P3. Each input array is composed of a plurality of elements 112 which are arranged in rows and columns. The various optical elements in FIG. 7 are all placed at a distance of one another equal to the focal length of the lens 140 or 150.

Figure 8:
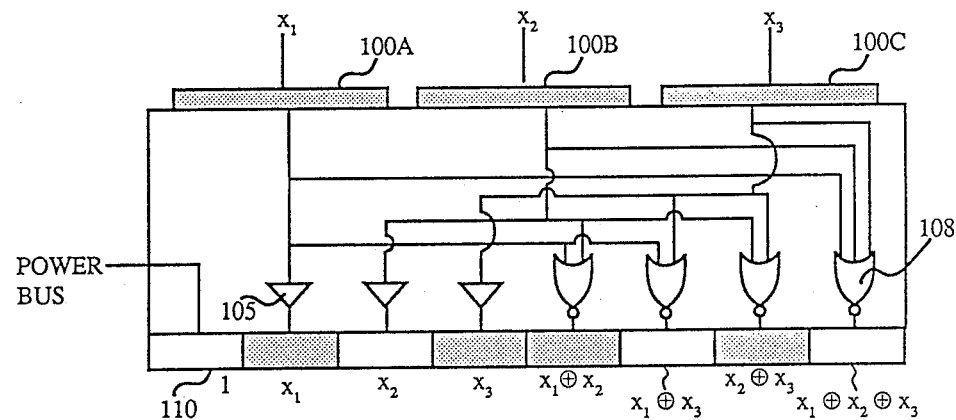
FIG. 8 represents a detailed architecture of an input plane in the optical correlator of FIG. 7 wherein a 3-variable input vector is mapped into a boolean basis vector using the Rademacher-Walsh transform.

FIG. 8 illustrates a one dimensional view of the the input plane of the optical coded phase correlator of the P1. A typical two dimensional spatial light modulator may serve the purpose of the input plane. However, special nonlinear electronic or optical gates must be built in the spatial light modulator. In FIG. 8, the numerals 100A, 100B and 100C represent the detector array, whereas the numeral 105 indicates the amplifier, and the number 108 denotes the XOR gates which connect different detector arrays to compute the boolean basis function on the source array 110. The circuitry illustrated in FIG. 8 represents the boolean basis vector for Rademacher-Walsh transform.

Figure 9:
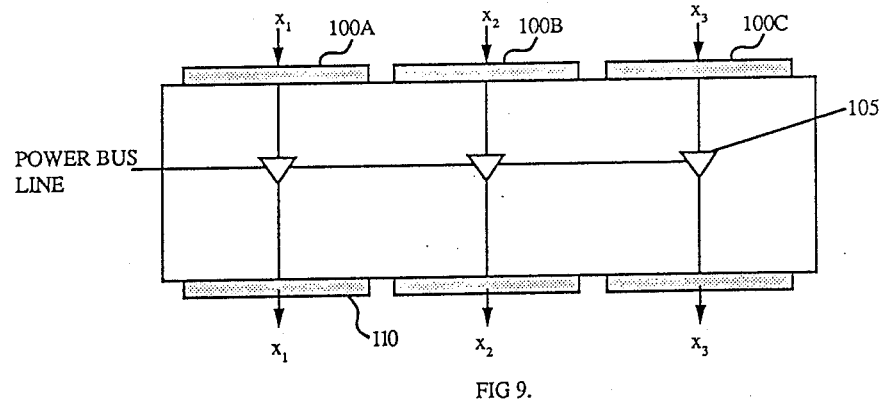
FIG. 9 represents another architecture of an input plane in the optical correlator of FIG. 7 wherein a 3-variable input vector is mapped into a boolean basis vector using a linear operation.

Reference is now made to FIG. 9 which shows a diagram of a three variable boolean basis input vector which is built in the input plane. The boolean basis input vector is a linear operation. The optical detector array 100A, 100B and 100C detects the optical signal then converts it to an electrical signal which is further amplified by an amplifier array 105. The output signals are then used to modulate the source array 110.

Figure 10:
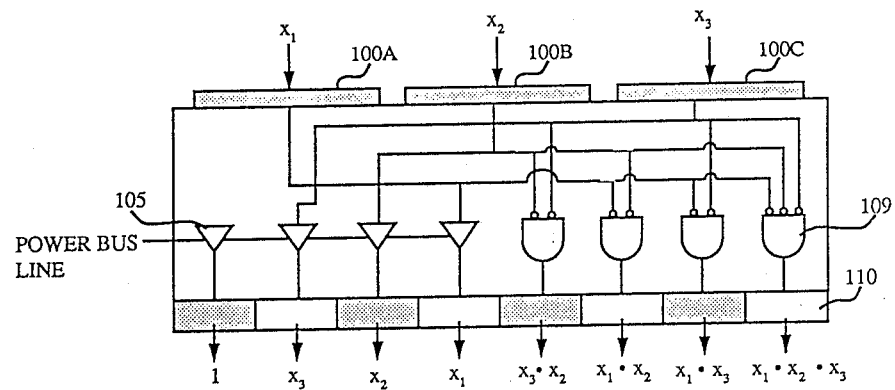
FIG. 10 represents another architecture of an input plane in the optical correlator of FIG. 7 wherein a 3-variable input vector is mapped into a boolean basis vector using the Reed-Muller expansion and a coding in the field $\{0,+1\}$.

Referring now to FIG. 10, there is shown another diagram comparable to FIGS. 8 and 9 and illustrating the same principle described hereabove in connection with FIGS. 8 and 9. The boolean basis function, however, is produced by an AND operation by means of AND-gates 109 at the output of the detector array 100A, 100B, 100C. The boolean input vector created by the AND-circuitry 109 corresponds to the Reed-Muller expansion for this particular embodiment.

Figure 11:
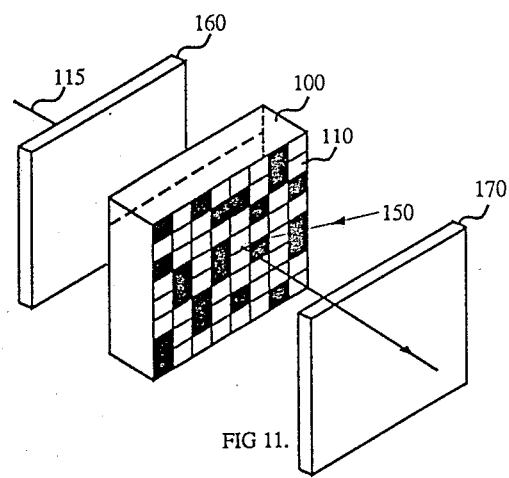
FIG. 11 illustrates a two-dimensional representation of the input planes in the coded phase optical correlator of FIG. 7.

FIG. 11 illustrates an exemplary input plane employed in the optical processor illustrated in FIG. 7. This input plane typically comprises a two dimensional spatial light modulator. The numeral 100 designates the detector array and the numeral 110 indicates the modulated source array. All the non-linear gates are built in-between the detector array 100 and the source array 110. The light writing beam 115 is transmitted through the polarizer 160 and the light reading beam 150 passes through an analyzer 170. In principle, the operation of spatial light modulator is based on the properties of optically transparent media having controllable parameters which change the amplitude and phase of the light waves. This can be achieved by external amplitude and phase modulation of the light beam. Such changes are generally made by varying the absorption, refraction or reflection coefficients of the media and/or by rotating the plane of polarization.

Referring again to FIG. 11, light polarized by the polarizer 160 is transmitted through the pixels of the modulator 110. The plane of polarization is rotated clockwise or counterclockwise according to he modulation signal of the electro-optical effect. In order to transform the phase-modulated signal to an amplitude-modulated signal, the analyzer 170 is placed directly behind the modulator 110 at 90 degrees with the polarization plane. In the absence of electro-optic effects of the modulator 110, no light passes through the analyzer 170. The increase in the electro-optic effect at the pixels induces the rotation of the polarization plane of the spatial light modulator and changes the light amplitude at the analyzer output. Either a microchannel spatial light modulator or a Si-PLZT spatial light modulator may be chosen as input plane. However, future developments in spatial light modulator technology may further enhance the function and resolution of the optical system. This may include the use of GaAs spatial light modulators or optical logic gates.

OPTICAL BIPOLAR MATRIX MULTIPLIER

A different approach to the architecture of optical truth table look-up processor consists in using an optical bipolar matrix multiplier. This processor performs truth table mapping in both $\{0,1\}$ coding and $\{+1,-1\}$ coding. It shall be assumed that these two matrices R and S have $m \times n$ and $n \times q$ pixel elements of size $2\Delta x \times 2 \times y$ respectively. Each pixel consists of 4 segments of size $\Delta x \times \Delta y$. Reference is now made to FIGS. 12a, 12b, 12c and 12d which illustrate the spectral encoding of a source plane matrix and of a spectral coefficient matrix. The gray level intensity of transmission of the pixel elements is the value of the matrix elements. The intensity level of the input plane is either dark or bright. The positive elements Rmn+ of the input plane are specified in the sectors 1,2 and the negative elements Rmn− on the sectors 3,4. However, the encoding of the spectral expansion vector is different. The positive elements Snq+ are specified on the sectors 2,4 and the negative elements Snq− on the sectors 1,3.

Figure 13:
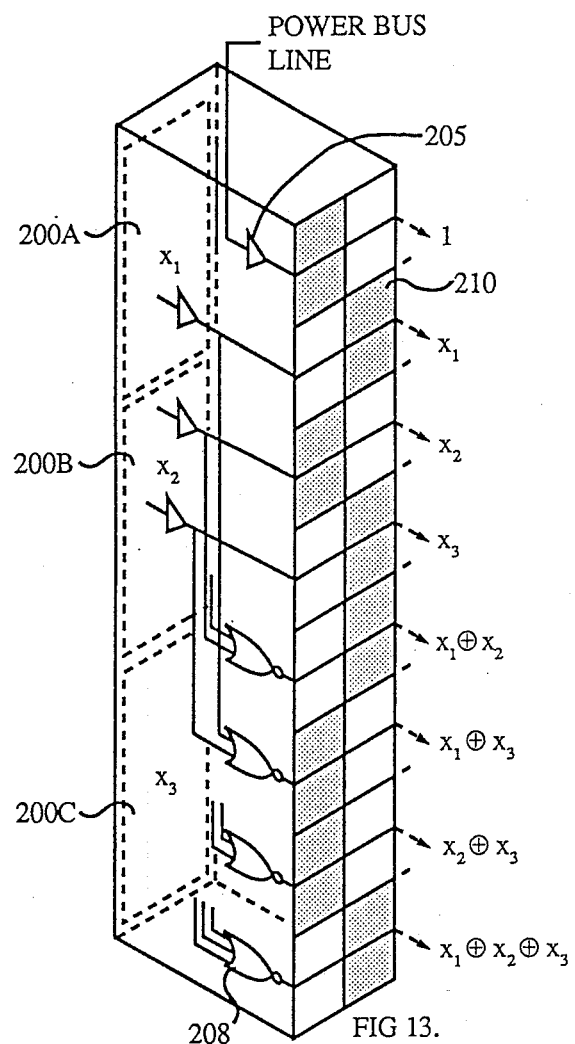
FIG. 13 illustrates a two-dimensional representation of the input plane used in the bipolar matrix multiplication processor as shown in FIG. 14, wherein a 3-variable input vector is mapped into a boolean basis vector by means of the Rademacher-Walsh transform.

FIG. 13 is a one dimensional view of the special encoding of the input plane. The truth table input variables are detected by the detector array 200A,200B,200C and are thereafter amplifier by the amplifier 205. The XOR-gates 208 perform an XOR operation among the different input variables. The output signal is sent to the source array 210 and is encoded either with the $\{0,1\}$ value, or $\{+1,-1\}$ value or $\{+1,0,-1\}$ value. The source array 210 modulates the plane wave to generate the encoded light signal.

Figure 14:
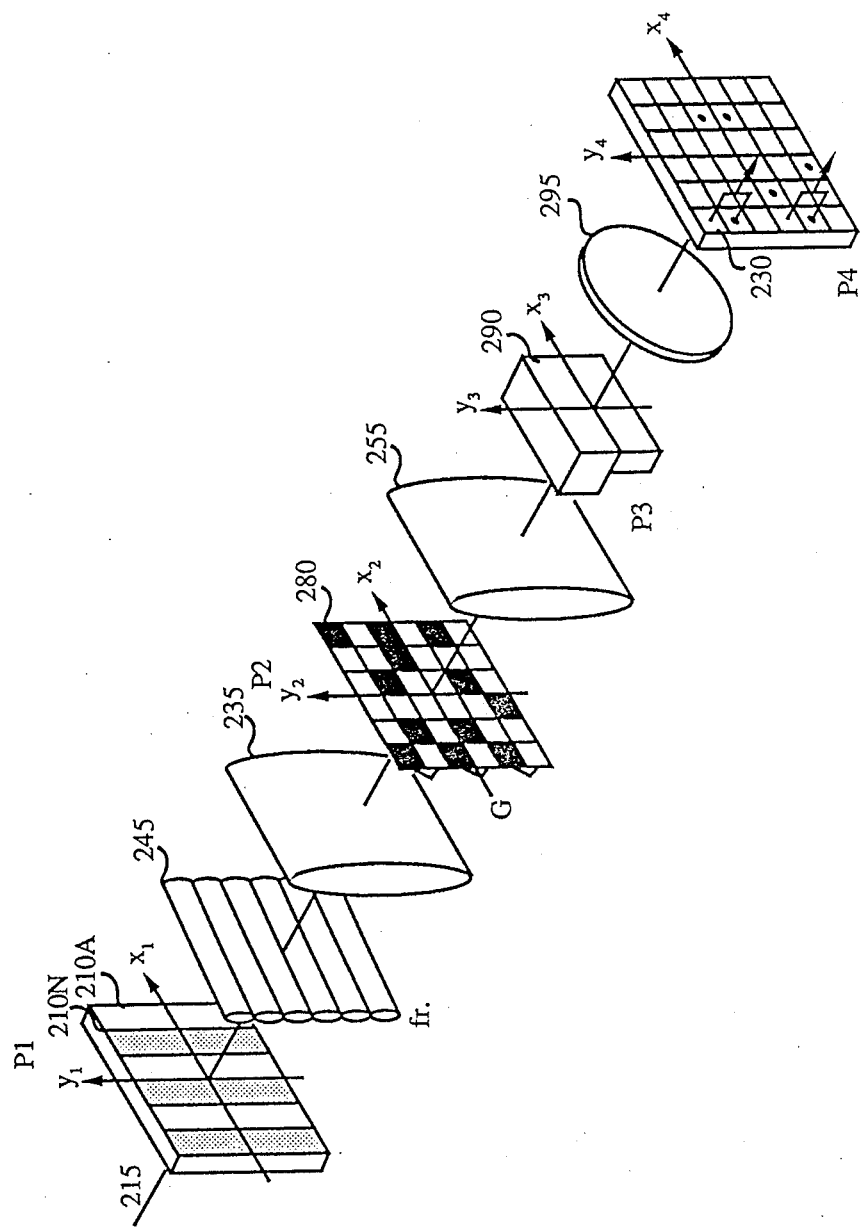
FIG. 14 illustrates a second preferred embodiment of the present invention representing a two-dimensional bipolar multiplication processor for implementing a truth-table look-up optical processor.

The second preferred embodiment incorporating the input plane of FIG. 13 is shown in FIG. 14 illustrating an optical matrix multiplier. This diagram further shows: M cylindrical lenses of aperture $2\Delta x \times 2\Delta y$ designated by the numeral 245. Cylindrical lenses 235 and 255 are interposed in front of and in the rear of a computer generated filter 280. This filter 280 has taped rasters. A tapered raster optical glass 290 is placed behind the cylindrical lens 255 and in front of a spherical lens 295.

In this preferred embodiment, the light signal emitted by the input plane comprising the special encoding described in FIG. 13 combines with the cylindrical lens array 245 and the cylindrical lens 235 to yield a modulated plane wave. This lightwave is modulated with the spherical expansion matrix Snq stored in the filter 280 and the tapered rasters in front of the computer generated filter. If f is the focal length of the lens 235 and fr is the focal length of the cylindrical lens array 245, the proper selection of the ratio f/fr ensures that the plane wave pass through the plane P2 and illuminate the computer generated filter 280 completely. The light signal 215 further passes through the plane P3 and undergoes another two dimensional Fourier transform through spherical lens 295. Finally, the positive amplitudes of the output light signal are summed on the segments of the plane P4 with coordinates $(2q+1)\Delta x$ along the x-axis and the negative amplitudes are summed on neighboring segments with coordinates $2q\Delta x$. The positive components and negative components are then compared by using the charge-coupled-packet-magnitude comparator array 230. The outputs on the charge-coupled-packets-magnitude comparator array indicating a boolean value of 0 or 1 are thereby generated. From equation (4), if the positive components are larger, the boolean logic 0 is generated, otherwise, the boolean logic 1 is generated. Details of the charge-coupled-packet-magnitude comparator array are well-known in the art and can be found in an article entitled "Charge-coupled computing for focal plane image preprocessing", by E. Fossum, *Optical Engineering*, September 1987. This article is hereby incorporated by reference.

BIPOLAR OPTICAL CORRELATOR

Figure 15D:
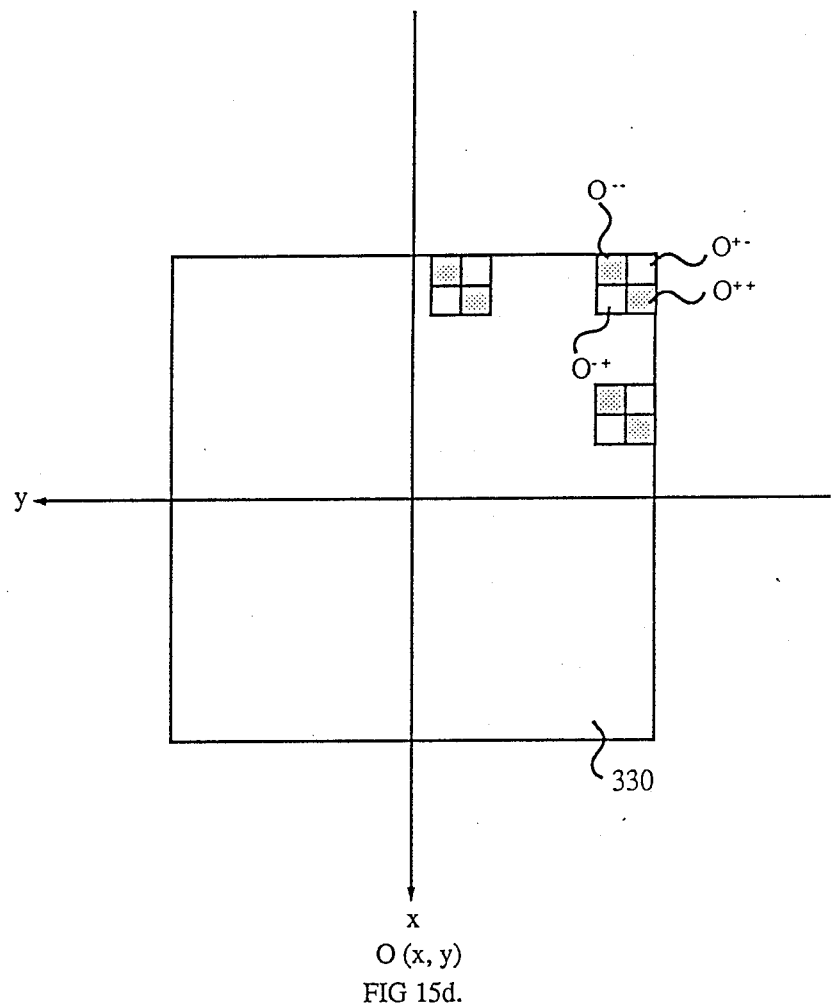
Figure 16:
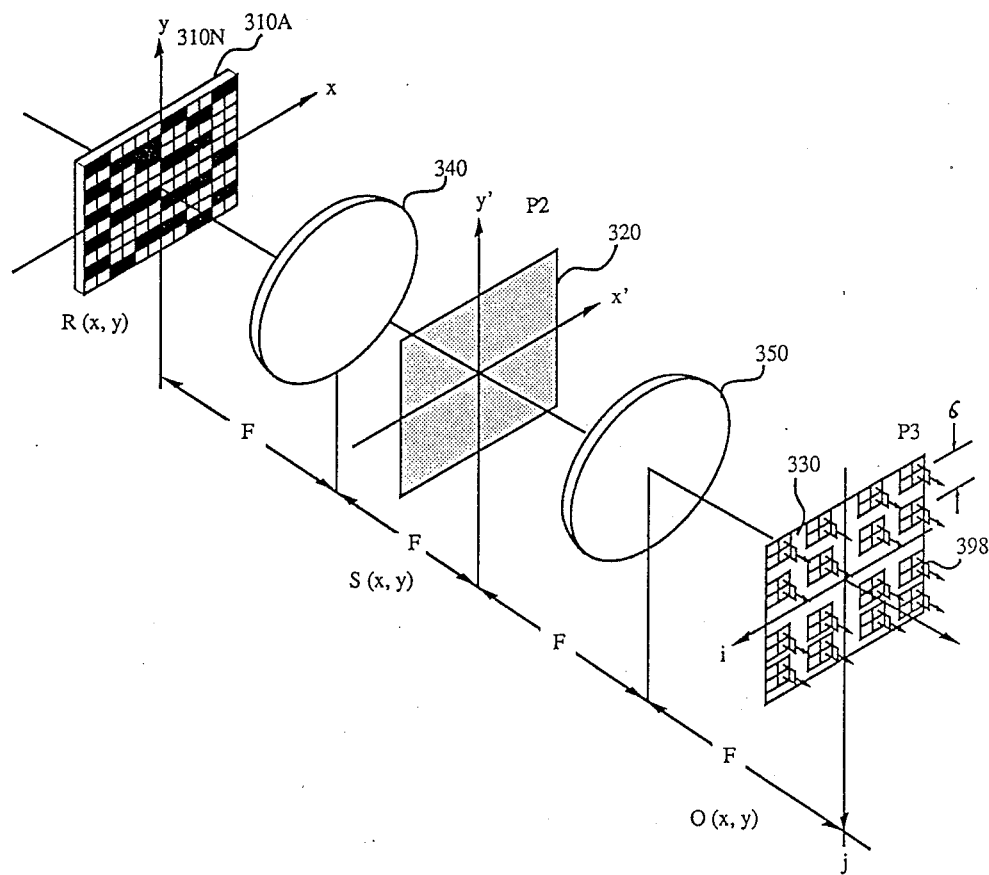
FIG. 16 illustrates the third preferred embodiment of the present invention representing a two-dimensional bipolar optical correlator for implementing a truth-table look-up processor.

Reference is now made to FIGS. 15a, 15b, 15c and 15d which will serve to illustrate a third embodiment of a bipolar coherent optical correlator illustrated in FIG. 16. In this embodiment, the bipolar coding $\{-1,+1\}$ is used in lieu of the coding $\{0,+1\}$. In a two-dimensional bipolar coherent optical correlator, the two-dimensional array shall be represented by $O(x',y')$ as illustrated in FIG. 15c and the complex spatial filter shall be represented by $S(x-x',y-y')$ as illustrated in FIG. 15b. The bipolar coded input boolean basis vector is represented by the vector $R(x,y)$ as shown in FIG. 15a. The spatial filter stores the function $S(x',y')$. Using the above notations, the following relation holds true:

$$O(x', y') = O_{mn}^{++} + O_{mn}^{--} - O_{mn}^{+-} - O_{mn}^{-+} = \int\int R(x, y) S(x - x', y - y') dx dy$$

wherein:

Omn++ represents the mnth cell of inner product operation of the position data;

Omn−− represents the mnth cell of inner product operation of the negative data.

Omn+− and Omn−+ represent the mnth cells of inner product operation of the positive data with negative data.

In FIGS. 15a to 15d, the positive elements R+ of the input plane are specified in the sectors 1, 3 and the negative elements in the sectors 2,4 as shown in FIGS. 15a and 15b. However, the encoding of the spectral expansion vectors is done differently, namely the positive elements S+ are specified in the sectors 1,2 and the negative elements S− in sectors 3,4. FIG. 15d shows the final result of this spectral encoding in the output plane 330.

Referring now to FIG. 16, there is illustrated in details the third preferred embodiment of the present invention representing a coded bipolar phase correlator. The coded bipolar phase correlator is similarly set up as the correlator described in connection with FIG. 7. Furthermore, the input plane coding is identical to the coding illustrated in FIG. 13. However, the output cross correlation point consists of four sectors of data $O++(\Delta x,\Delta y)$, $0+-(\Delta x,\Delta y)$, $0-+(\Delta x,\Delta y)$ and $0--(\Delta x,\Delta y)$. A special CCD detector array 398 consists of an adder and of a comparator placed at the output plane 330. The CCD detector array 398 performs addition and comparison if the result indicates that Omn+ >Omn−. This is equivalent to binary logic 0; otherwise the result is negative, which is equivalent to binary logic 1. The other optical elements in FIG. 16 are identical to those of FIG. 7, as indicated by the last two digits of the corresponding numerals. As in FIG. 16, the optical elements in FIG. 16 are separated from one another by the same distance which is equal to the focal length common to the lenses 340 and 350.

OPTICAL INNER PRODUCT MATRIX MULTIPLICATION PROCESSOR

Figure 17:
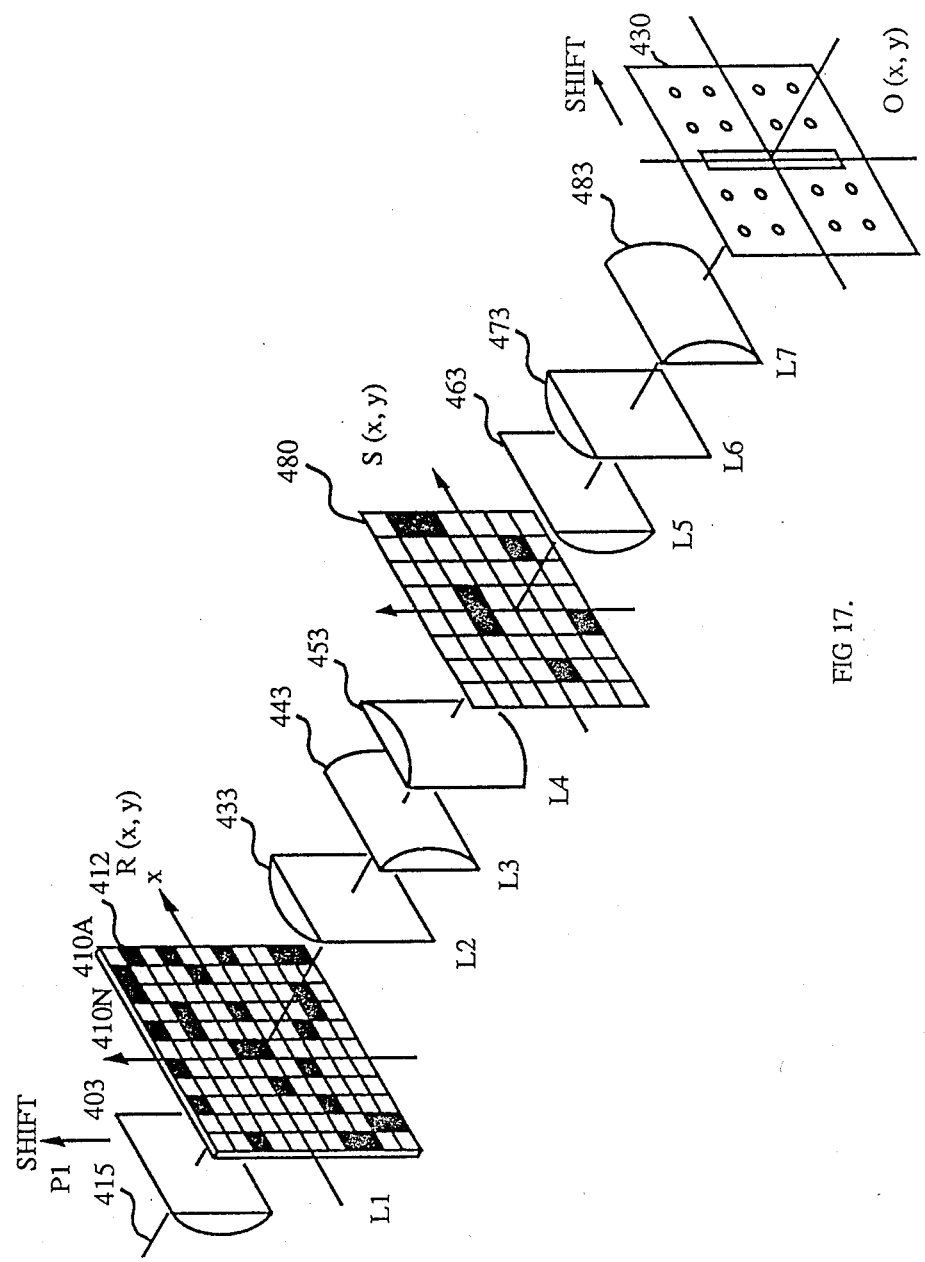
FIG. 17 illustrates the fourth preferred embodiment of the present invention representing a two-dimensional matrix multiplication processor for implementing a truth-table optical processor.

Reference is now made to FIG. 17 which illustrates a matrix multiplication implementation of truth-table look-up processor according to the present invention. the coding is in the field $\{0,1\}$. The input plane 410 contains a boolean basis vector array wherein the data are spatially shifted in the form of arrays 410A, . . . , 410N. The numeral 415 designates the coherent light beam. The beam 415 passes through the input plane 410 after passing through the cylindrical lens 403 and further through cylindrical lenses 433, 443 and 453. Upon impinging on the filter 480, the light beam 415 undergoes a spatial multiplication with the spectral expansion vector $S(x,y)$. The focal length of the lens 403 is chosen to be f1 whereas the distance between the lenses 433 and 453 is 2f1 and the distance between the lens 453 and the filter 480 is f1. The light beam further passes through the lenses 463, 473 and 483. The final matrix multiplication result is shown on the output plane 430. The processor illustrated in FIG. 17 represents an advance in technology insofar as it solves the diffraction problem heretofore encountered in the prior art matrix multiplication processors. In a final step of the matrix multiplication performed by the processor of the present invention, the input boolean basis vector array must be spatially shifted, as well as the output detector array. The distance between the various optical elements represented in FIG. 17 are as follows: the distance between the filter 480 and the lens 473 is the same as the distance between the lens 463 and the output plane 430.

Figure 18:
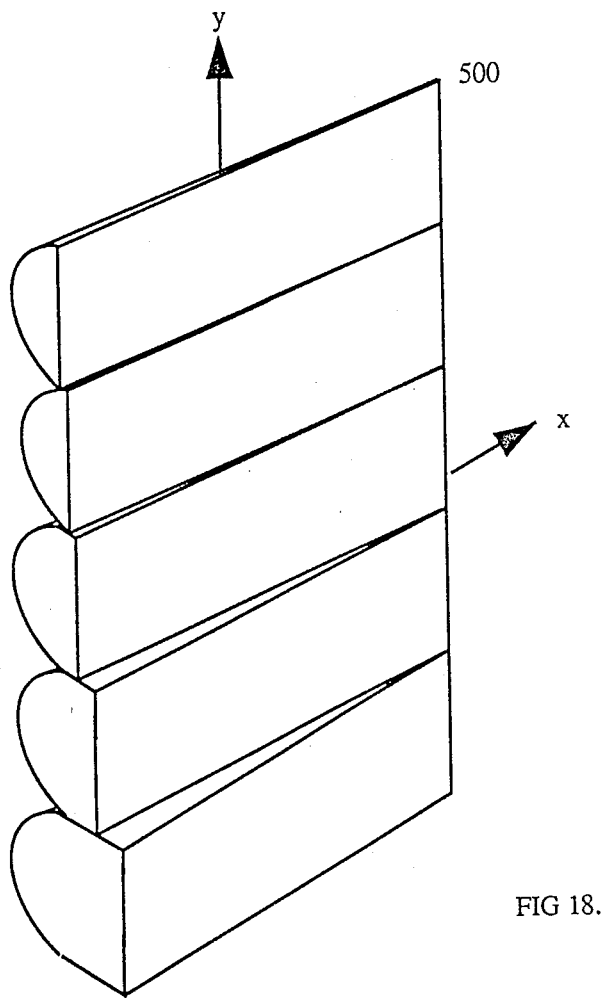
FIG. 18 illustrates a cylindrical lens consisting of a vertical array of cylindrical lenses with different wedge sizes to be used in the matrix multiplication processor of FIG. 17.

The output plane may consist of a two-dimensional boolean basis vector if the cylindrical lens 403 in FIG. 17 is replaced by the vertical array of cylindrical lenses 500 with different wedge sizes, as illustrated in FIG. 18. In this case, the output plane consists of a two-dimensional detector array. As to the input plane, the implementation thereof is identical to the one described in connection with FIGS. 8, 9 and 10. The output plane is identical to the output plane used in the coded phase correlator implementations of a truth table look-up processor.

The applications of the present invention are numerous and comprise two-dimensional read only memories, which can be greatly improved using the unique mapping between addresses and data provided by the embodiments of the present invention. This invention makes it possible to perform numerical operations (matrix multiplication) and logical operations with great accuracy and speed.

Neural networks can also be improved using the present invention. Neural networks have been discussed at length by Rummelhart et al, *Parallel Distributed Processing*. The optical output hereabove described can be used as a basic building block for neural networks. The output signals of the optical truthtable look-up processor of the present invention can be used as input signals for other devices, which may consist of a plurality of processing elements or may be identical to the foregoing processor (feedback processing). Neural networks consist generally of content-addressable memories, instar, outstar, crossbar-associated memories, back propagation networks and counterpropagation networks. The requirements of neural networks are met by the preferred embodiments of the present invention as they can provide the very high system throughputs that neural networks require.

Computer-generated holograms are also well-known in the art as well as the methods for storing coefficients therein. A description of such methods can be found in "Computer-Generated Holograms: techniques and applications", by Wai-Hon Lee, in E. Wolf, *Progress in Optics XIV*, North Holland, 1978 and in "recent Approaches to Computer-Generated Holograms" by D. C. Chu and J. R. Fienup, *Optical Engineering*, May/June 1974, Vol. 13, No. 3. Holograms can also be generated using photorefractive crystals as described in "Simple Computational Models of Image Correlation by 4-wave Mixing in Photorefractive Media", by A. G. Nicholson et al, *Applied Optics*, Vol. 76, No. 2, Jan. 5 1982.

While the preferred embodiments of the present invention have been disclosed and variations have been suggested as well as for the methods hereby disclosed, it should be understood that other embodiments and processes may be devised and modifications may be made thereof without departing from the spirit of the invention and the scope of the appended claims.

What is claimed is:

1. An optical processor for generating a looked-up digital light signal from input and output data of a truth-table, which comprises:
    means for detecting and coding an input light signal emitted by a light source, said light signal representing a plurality of digital input vectors for said binary truth-table;
    input means for receiving said input light signal and for transforming said plurality of digital input vectors into a boolean basis vector, in conformance with a predetermined transform;
    means for multiplying said boolean basis vector by the truth-table output data corresponding to said input light signal;
    optical means impinged by said boolean basis vector for storing a product of said means for multiplying;
    means for presenting said product as a spectral expansion vector having coefficients which can be positive, negative or zero, of said output data;
    means for performing an inner product of said spectral expansion vector with said boolean basis vector and for generating an output light signal corresponding to said output data; and
    output means for receiving said output light signal exiting from said means for generating.

2. The truth-table look-up optical processor as defined in claim 1, wherein said means for performing further comprise means for matrix-multiplying said spectral expansion vector with said boolean basis vector.

3. The truth-table look-up optical processor as defined in claim 2, wherein said means for matrix-multiplying comprises a plurality of cylindrical lenses.

4. The truth-table look-up optical processor as defined in claim 3, wherein at least one of said cylindrical lenses comprises at least one vertical array of cylindrical lenses with different wedge sizes.

5. The truth-table look-up optical processor as defined in claim 3, wherein at least one of said cylindrical lenses comprises a plurality of second cylindrical lenses, an aperture of each of said second cylindrical lenses being substantially four times the area of a pixel on said input means, said input means comprising at least one array of said pixels appearing as light and dark portions of said input light signal.

6. The truth-table look-up optical processor as defined in claim 2, further comprising a tapered raster optical glass placed between said means for storing and said output means.

7. The truth-table look-up optical processor as defined in claim 2, further comprising at least one Fourier transform lens.

8. The truth-table look-up optical processor as defined in claim 1, wherein said means for performing further comprise means for correlating said spectral expansion vector with said boolean basis vector.

9. The truth-table look-up optical processor as defined in claim 8, wherein said means for correlating comprises means for Fourier transforming said boolean basis vector.

10. The truth-table look-up optical processor as defined in claim 9, wherein said means for Fourier-transforming comprises at least one Fourier transform lens.

11. The truth-table look-up optical processor as defined in claim 1 further comprising means for polarizing said input light signal prior to impinging of said input light signal upon said means for detecting.

12. The truth-table look-up optical processor as defined in claim 1 further comprising means for analyzing said boolean basis vector exiting from said input means.

13. The truth-table look-up optical processor as defined in claim 1, wherein said predetermined transform is selected from a set of orthogonal transforms.

14. The truth-table look-up optical processor as defined in claim 13, wherein said predetermined transform is a Walsh transform.

15. The truth-table look-up optical processor as defined in claim 14, wherein said predetermined transform is a Walsh-Hadamard transform.

16. The truth-table look-up optical processor as defined in claim 14, wherein said predetermined transform is a Rademacher-transform.

17. The truth-table look-up optical processor as defined in claim 14, wherein said predetermined transform is a Walsh-Kaczmarz transform.

18. The truth-table look-up optical processor as defined in claim 13, wherein said predetermined transform is a Haar transform.

19. The truth-table look-up optical processor as defined in claim 1, wherein said predetermined transform is a Reed-Muller expansion.

20. The truth-table look-up optical processor as defined in claim 1, wherein said optical means for storing comprises at least one computer-generated hologram.

21. The truth-table look-up optical processor as defined in claim 1, wherein said light source is a coherent light source.

22. The truth-table look-up optical processor as defined in claim 1, wherein said input means comprises a two-dimensional spatial light modulator.

23. The truth-table look-up optical processor as defined in claim 22, wherein said modulator comprises non-linear gates.

24. The truth-table look-up optical processor as defined in claim 22, wherein said modulator comprises bipolar encoding of the source array.

25. The truth-table look-up optical processor as defined in claim 1, wherein said output means comprises a charge-coupled device (CCD) array.

26. The truth-table look-up optical processor as defined in claim 25, wherein said device array comprises a charge-coupled-packet-magnitude comparator.

27. The truth-table look-up optical processor as defined in claim 1 forming an integral part of a two-dimensional matrix numerical unit.

28. The truth-table look-up optical processor as defined in claim 1 forming an integral part of a neural network.

29. The truth-table look-up optical processor as defined in claim 1 forming an integral part of a numerical optical computer.

30. The truth-table look-up optical processor as defined in claim 1 forming an integral part of a non-erasable memory.

31. A method for implementing a truth-table look-up optical processor comprising the steps of:
   selecting a binary truth-table comprising a plurality of digital input vectors and a plurality of digital outputs;
   coding an input light signal so that said coded input light signal represents said digital input vectors;
   selecting a transform and performing an operation on said digital outputs by said transform so as to obtain a spectral expansion vector corresponding to said binary truth-table;
   generating a boolean basis vector corresponding to said digital input vectors by means of said transform;
   encoding said coded light signal so that said encoded light signal represents said boolean basis vector;
   performing an inner product of said spectral expansion vector with said boolean basis vector, the result of said inner product yielding said digital outputs of said binary truth-table; and
   outputting said encoded light signal after said boolean basis vector corresponding to said encoded light signal has undergone said inner product operation, said output light signal representing said digital outputs of said binary truth-table.

32. The method for implementing a truth-table look-up optical processor as defined in claim 31, further comprising the step of coding said digital input vectors and said digital outputs in a Galosis field $\{0,1\}$.

33. The method for implementing a truth-table look-up optical processor as defined in claim 31, further comprising the step of coding said digital input vectors and said digital outputs in a set $\{-1,+1\}$.

34. The method for implementing a truth-table look-up optical processor as defined in claim 31, further comprising the step of coding said digital input vectors and said digital outputs in a set $\{-1,0,+1\}$.

35. The method for implementing a truth-table look-up optical process as defined in claim 33 or claim 34 wherein said step of performing said inner product further comprises the step of performing said inner product separately in each respective domain of the real domain, the combination of the positive domain and of the negative domain of the boolean basis vector with the positive domain and the negative domain of the spectral expansion vector yielding four types of digital outputs.

36. The method for implementing a truth-table look-up optical processor as defined in claim 35, wherein the step of performing said inner product further comprises the step of summing said positive digital outputs and the step of summing said negative outputs.

37. The method for implementing a truth-table look-up optical processor as defined in claim 36, wherein the step of performing said inner product further comprises the step of comparing said summed positive outputs with said summed negative outputs.

38. The method for implementing a truth-table look-up optical processor as defined in claim 31 wherein the step of performing said inner product comprises the step of matrix-multiplying said boolean basis vector with said spectral expansion vector.

39. The method for implementing a truth-table look-up optical processor as defined in claim 31, wherein the step of performing said inner product comprises the step of correlating said boolean basis vector with said spectral expansion vector.

* * * * *